(12) United States Patent
Wong et al.

(10) Patent No.: US 10,829,191 B2
(45) Date of Patent: Nov. 10, 2020

(54) SYSTEM AND METHOD FOR POSITIONING A MARINE VESSEL

(71) Applicant: Marine Canada Acquisition Inc., Richmond (CA)

(72) Inventors: Ray Tat Lung Wong, Richmond (CA); Pierre Garon, Trois-Rivieres (CA); Geoffrey David Duddridge, Nanaimo (CA)

(73) Assignee: Marine Canada Acquisition Inc., Richmond (CA)

( * ) Notice: Subject to any disclaimer, the term of this patent is extended or adjusted under 35 U.S.C. 154(b) by 0 days.

(21) Appl. No.: 15/520,841

(22) PCT Filed: Feb. 10, 2017

(86) PCT No.: PCT/CA2017/050168
§ 371 (c)(1),
(2) Date: Apr. 20, 2017

(87) PCT Pub. No.: WO2017/136955
PCT Pub. Date: Aug. 17, 2017

(65) Prior Publication Data
US 2019/0084662 A1 Mar. 21, 2019

Related U.S. Application Data

(60) Provisional application No. 62/293,745, filed on Feb. 10, 2016.

(51) Int. Cl.
*G05D 1/00* (2006.01)
*B63H 25/42* (2006.01)
(Continued)

(52) U.S. Cl.
CPC .............. *B63H 25/42* (2013.01); *B63H 25/04* (2013.01); *G05D 1/0208* (2013.01); *B63H 20/12* (2013.01);
(Continued)

(58) Field of Classification Search
CPC .. B63H 25/42; B63H 25/04; B63H 2025/045; B63H 20/12; G05D 1/0208; G05D 1/027
(Continued)

(56) References Cited

U.S. PATENT DOCUMENTS

| 5,031,561 A | 7/1991 | Nilsson |
|---|---|---|
| 5,491,636 A | 2/1996 | Robertson et al. |

(Continued)

FOREIGN PATENT DOCUMENTS

WO    WO2013123208 A1    8/2013

OTHER PUBLICATIONS

WIPO, Canadian International Searching Authority, International Search Report, dated May 16, 2017 in PCT International Application No. PCT/CA2017/050168, 5 pages.
(Continued)

*Primary Examiner* — Masud Ahmed
(74) *Attorney, Agent, or Firm* — Berenato & White, LLC

(57) ABSTRACT

A marine vessel control system comprises a propulsion unit and a steering actuator for steering the propulsion unit. There is a shift actuator for shifting gears in the propulsion unit and a throttle actuator for increasing or decreasing throttle to the propulsion unit. There is an input device for providing user inputted steering commands to the steering actuator and for providing user inputted shift and throttle commands to the shift actuator and the throttle actuator. There is a sensor for detecting a global position and a heading direction of the marine vessel. A controller receives position and heading values of the marine vessel from the
(Continued)

sensor. The controller compares the received position value to a pre-programmed position value to determine a position error difference. The controller also compares the received heading value to a pre-programmed heading value to determine a heading error difference.

20 Claims, 20 Drawing Sheets

(51) Int. Cl.
  *G05D 1/02* (2020.01)
  *B63H 25/04* (2006.01)
  *B63H 20/12* (2006.01)
(52) U.S. Cl.
  CPC ....... *B63H 2025/045* (2013.01); *G05D 1/027* (2013.01)
(58) Field of Classification Search
  USPC .................................................... 701/21, 41
  See application file for complete search history.

(56) References Cited

U.S. PATENT DOCUMENTS

| 6,721,638 | B2 * | 4/2004 | Zeitler | G05D 1/0261 |
| | | | | 180/408 |
| 7,305,928 | B2 * | 12/2007 | Bradley | B63H 21/22 |
| | | | | 114/144 A |
| 7,325,505 | B2 * | 2/2008 | Otobe | B63H 21/265 |
| | | | | 114/144 R |
| 7,743,721 | B2 | 6/2010 | Barrett et al. | |
| 8,145,371 | B2 | 3/2012 | Rae et al. | |
| 8,265,826 | B2 * | 9/2012 | Feller | A01B 69/007 |
| | | | | 701/41 |
| 8,924,054 | B1 | 12/2014 | Arbuckle et al. | |
| 9,039,468 | B1 | 5/2015 | Arbuckle et al. | |
| 2003/0191562 | A1 * | 10/2003 | Robertson | B63H 25/42 |
| | | | | 701/21 |
| 2008/0027597 | A1 * | 1/2008 | Barrett | B63H 25/04 |
| | | | | 701/21 |
| 2010/0023192 | A1 * | 1/2010 | Rae | B63H 11/107 |
| | | | | 701/21 |

OTHER PUBLICATIONS

WIPO, Canadian International Searching Authority, Written Opinion of the International Searching Authority, dated May 16, 2017 in PCT International Application No. PCT/CA2017/050168, 5 pages.
Supplementary European Search Report dated Sep. 18, 2019 from corresponding EP Application No. 17749883; 7 pages.

* cited by examiner

| Fault detection and handling | | | Fault display | | |
|---|---|---|---|---|---|
| Type | Trigger | Recovery | Description | System status | Instructions |
| Warning | PGN 129025 lost for 5s | One PGN 12902 received. | Joystick lost communication with GPS antenna. | Station is disengaged. Joystick is enabled. | Monitor vessel surroundings. Manual vessel control is required. |
| Warning | PGN 129025 longitude or latitude data invalid for 5s<br><br>OR<br><br>Latitude or Longitude yield SOG of 60m/s<br><br>OR<br>Latitude or Longitude do not change for 5s | One PGN 129025 received with valid longitude and latitude.<br><br>AND<br><br>Latitude and Longitude yield SOG below 60m/s for 1s<br>AND<br>Latitude and Longitude change values | No GPS fix or data unstable. | Station is disengaged.<br><br><br><br><br><br>Joystick is enabled. | Monitor vessel surroundings.<br><br><br><br><br><br>Manual vessel control is required. |
| Warning | PGN 127250 lost for 5s | One PGN 127250 received. | Joystick lost communication with heading sensor. | Station is disengaged. Joystick is enabled. | Monitor vessel surroundings. Manual vessel control is required. |

FIG. 18A

| Fault detection and handling | | | Fault display | | |
|---|---|---|---|---|---|
| Type | Trigger | Recovery | Description | System status | Instructions |
| Warning | PGN 127250 heading data invalid for 5s<br><br>OR<br><br>Heading does not change for 5s | One PGN 127250 received with valid heading data<br><br>AND<br><br>Heading changes value | No Heading fix or data unstable. | Station is disengaged.<br><br>Joystick is enabled. | Monitor vessel surroundings.<br><br>Manual vessel control is required. |
| Warning | Position error > 12m<br><br>Note that the threshold is configurable via Datalink with Engr privs | Position error < 70% trigger threshold<br>OR<br>exited Station | Significant position change detected. | Station is still engaged. | Monitor vessel surroundings. Manual vessel control may be required. Adjusting / disabling heading hold may improve performance. |
| Warning | Heading error > 45°<br><br>Note that the threshold is configurable via Datalink with Engr privs | Heading error < 60% trigger threshold<br>OR<br>exited Station | Significant heading change detected. | Station is still engaged. | Monitor vessel surroundings. Manual vessel control may be required. Adjusting the heading may improve performance. |

FIG. 18B

SYSTEM AND METHOD FOR POSITIONING A MARINE VESSEL

FIELD OF THE INVENTION

The present invention relates to a system and method for positioning a marine vessel and, in particular, to a system and method for automatically maintaining a selected position or heading of a marine vessel.

BACKGROUND OF THE INVENTION

U.S. Pat. No. 5,031,561, which issued to Nilsson on Jul. 16, 1991, discloses a steering and manoeuvering system for water-borne vessels with two individually turnable propulsion units arranged mutually spaced athwartships in the stern portion of the vessel. The system includes an actuating turning device which is actuable by a steering control, e.g. a lever, such as to maintain the propulsing units parallel during turning in normal sailing of the vehicle ahead or astern, i.e. in the so-called normal steering mode. There is an actuating drive device for setting the propulsive power and direction ahead/astern of the respective propulsion units, the drive device being actuable by a power control. The system is switchable between said normal steering mode and at least one special manoeuvering mode, in which the two propulsion units achieve a force resultant directed substantially athwartships for athwartships and/or turning movement of the vessel.

U.S. Pat. No. 7,305,928, which issued to Bradley et al. on Dec. 11, 2007, discloses a vessel positioning system which maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 5,491,636, which issued to Robertson et al. on Feb. 13, 1996, discloses an anchorless boat positioning system which dynamically and automatically maintains a boat at a selected anchoring location within water without the use of a conventional anchor. The system uses a steerable thruster whose thrust and steering direction are determined on the basis of position information signals received from global positioning system (GPS) satellites and heading indication signals from a magnetic compass. The anchorless positioning system continuously monitors the position and heading of the boat and compares it with the stored coordinates of the selected anchoring location to generate control signals for the steerable motor.

SUMMARY OF THE INVENTION

It is an object of the present invention to provide a system and method for automatically maintaining a selected position or heading of a marine vessel.

There is accordingly provided a marine vessel control system comprising a propulsion unit and a steering actuator for steering the propulsion unit. There is a shift actuator for shifting gears in the propulsion unit and a throttle actuator for increasing or decreasing throttle to the propulsion unit. There is an input device for providing user inputted steering commands to the steering actuator and for providing user inputted shift and throttle commands to the shift actuator and the throttle actuator. There is a sensor for detecting a global position and a heading direction of the marine vessel. A controller receives position and heading values of the marine vessel from the sensor. The controller compares the received position value to a pre-programmed position value to determine a position error difference. The controller also compares the received heading value to a pre-programmed heading value to determine a heading error difference.

The controller may automatically actuate the shift actuator and the throttle actuator in the presence of a position error difference so that the propulsion unit provides counteracting thrusts to minimize the position error difference. The controller may detect a direction of a disturbance causing the position error difference. The controller may actuate the steering actuator to steer the propulsion unit such that the counteracting thrusts of the propulsion unit are opposite in direction to the disturbance. The counteracting thrusts of the propulsion unit may be equal in magnitude to the force of the disturbance. The controller may automatically actuate the steering actuator in the presence of a heading error difference to steer the propulsion unit to minimize the heading error difference.

There is also provided a method of maintaining a marine vessel in a selected position comprising determining a first global position of the marine vessel and determining a first heading of the marine vessel. A signal command to maintain the first global position of the marine vessel is received, and the first global position of the marine vessel is stored as a target global position in response to receiving the signal command. A second global position of the marine vessel resulting from a disturbance applied to the marine vessel is determined. A position error difference between the second global position and the target global position is calculated. A second heading of the marine vessel which is aligned with the disturbance is determined. The marine vessel is rotated to achieve the second heading. A propulsion unit of the marine vessel is actuated to produce a linear thrust. The linear thrust is equal in magnitude and opposite in direction to the disturbance, thereby minimizing the position error difference.

The second heading of the marine vessel may be aligned with the disturbance such that a nose of the marine vessel is facing towards a direction of the disturbance, and the propulsion unit may produce a forward thrust. The second heading of the marine vessel may be aligned with the disturbance such that a nose of the marine vessel is facing away from a direction of the disturbance, and the propulsion unit may produce a reverse thrust. The second heading of the marine vessel may be aligned with the disturbance such that the force of the disturbance is applied equally and symmetrically to the marine vessel relative to a centerline of the marine vessel.

The method may further include detecting a change in the disturbance and determining a third global position of the marine vessel resulting from the changed disturbance. A subsequent position error difference may be calculated between the third global position and the target global position. A third heading of the marine vessel which is aligned with the changed disturbance may be determined. The marine vessel may be rotated to achieve the third heading. The propulsion unit of the marine vessel may be actuated to produce a subsequent linear thrust. The subsequent linear thrust may be equal in magnitude and opposite in direction to the changed disturbance, thereby minimizing the subsequent position error difference.

There is further provided another method of maintaining a marine vessel in a selected position comprising determining a first global position of the marine vessel and receiving a signal command to maintain the first global position of the marine vessel. The first global position of the marine vessel is stored as a target global position in response to receiving the signal command. A second global position of the marine vessel resulting from a disturbance applied to the marine vessel is determined. A position error difference between the second global position and the target global position is calculated. First and second propulsion units of the marine vessel are actuated to produce respective thrusts. A thrust intersection point of the propulsion units is at an instantaneous center of rotation of the marine vessel such that a lateral thrust is generated. The lateral thrust is equal in magnitude and opposite in direction to the disturbance, thereby minimizing the position error difference. A heading of the marine vessel may rotate freely to achieve a stable heading.

There is still further provided a method of maintaining a marine vessel in a selected position range comprising determining a target position of the marine vessel and determining a target position range of the marine vessel. The target position range has a preset radius and a center corresponding to the target position of the marine vessel. A current global position of the marine vessel within the target position range is determined. A position error difference between the current global position and the target position is calculated. A propulsion unit of the marine vessel is actuated and steered to drive and steer the marine vessel towards the target position, thereby minimizing the position error difference.

The target position may be between the current global position and the disturbance. The marine vessel may be steered and driven towards the disturbance. A heading of the marine vessel may be aligned with a direction of the disturbance. The propulsion unit may be actuated to produce a linear thrust which is equal in magnitude and opposite in direction to the disturbance, thereby minimizing the position error difference. The linear thrust may be reduced when the marine vessel reaches a perimeter of the target position range and the marine vessel may drift away from the perimeter of the target position range due to the force of the disturbance. The propulsion unit of the marine vessel may be a single propulsion unit.

There is still yet further provided a method of maintaining movement of a marine vessel along a selected course comprising receiving a signal command to move the marine vessel along the selected course and setting a heading of the marine vessel to a pre-programmed target heading. An angle of the target heading is different from an angle of the selected course. The marine vessel may drift along the selected course. Steering and thrust commands may be provided to move the marine vessel along the selected course. The method may include determining a current heading of the marine vessel and calculating a heading error difference between the current heading and the target heading. A thrust may be generated to rotate the marine vessel, thereby minimizing the heading error difference. This may be displayed as shown in FIG. 17.

BRIEF DESCRIPTION OF THE DRAWINGS

The invention will be more readily understood from the following description of the embodiments thereof given, by way of example only, with reference to the accompanying drawings, in which:

FIGS. 18A and 18B show a list of faults that a joystick can detect when an ASK controller is enabled.

DESCRIPTION OF SPECIFIC EMBODIMENTS

Figure 1:
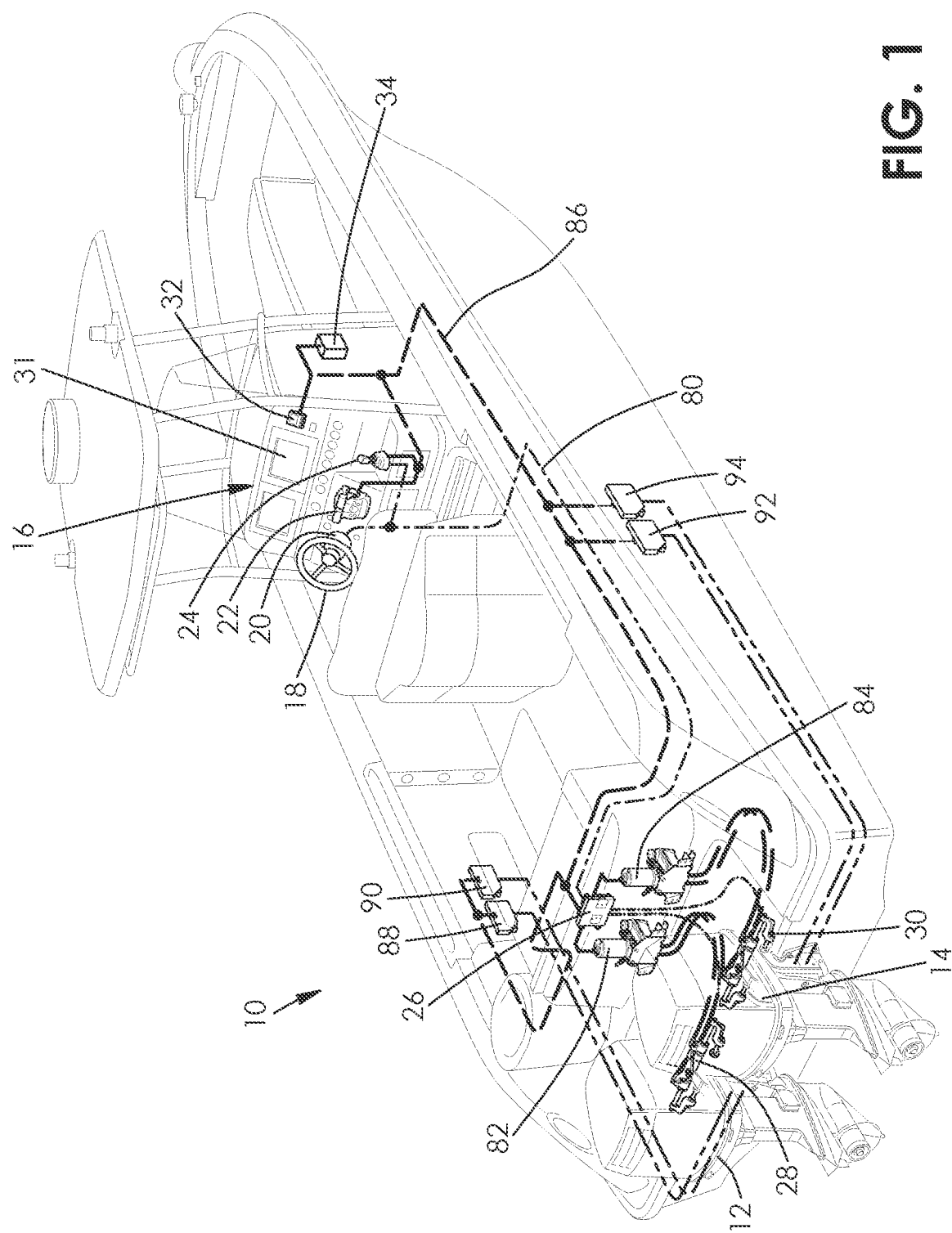
FIG. 1 is a perspective view of a marine vessel provided with a plurality of propulsion units and an improved marine vessel control system.

Referring to the drawings and first to FIG. 1, there is shown a marine vessel 10 which is provided with propulsion units in the form of outboard engines 12 and 14. In this example, there are two engines, namely, a port engine 12 and a starboard engine 14. However, in other examples, the marine vessel may be provided with any suitable number of engines. The marine vessel 10 is also provided with a control station 16 that supports a steering wheel 18 mounted on a helm 20, a control head 22, and an input device which in this example is a joystick 24. The control station 16 is similar to the type disclosed in PCT International Application Publication Number WO 2013/123208 A1 which was published on Aug. 22, 2013. The marine vessel 10 is accordingly provided with a control station generally similar to the type disclosed in PCT International Application Publication Number WO 2013/123208 A1 and the marine vessel 10 may be steered using either the steering wheel 18 and the helm 20 or, alternatively, the joystick 24.

Figure 2:
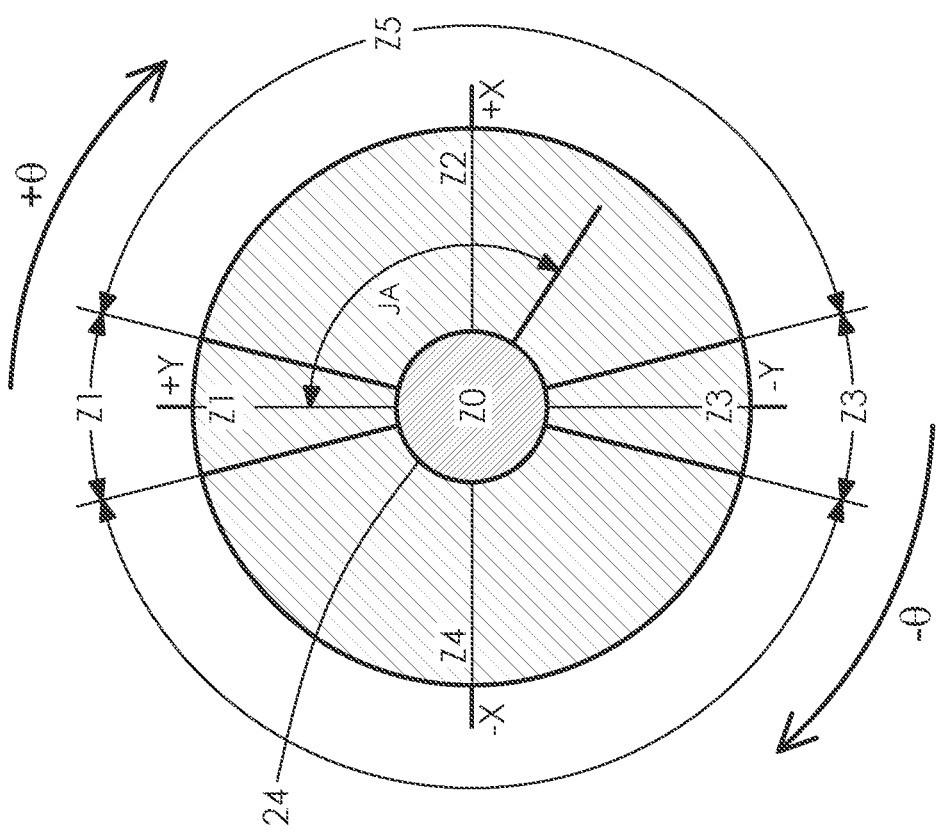
FIG. 2 is a simplified top plan view of a joystick of the marine vessel control system of FIG. 1 showing axes of movement of the joystick.

When the marine vessel 10 is steered using the joystick 24, and with reference to FIG. 2, movement of the joystick 24 along an X-axis moves the marine vessel 10 either starboard or port. Specifically, moving the joystick 24 in the positive direction along the X-axis moves the marine vessel starboard while moving the joystick 24 in the negative direction along the X-axis moves the marine vessel 10 port. Movement of the joystick 24 along a Y-axis moves the marine vessel 10 forward or in reverse. Specifically, moving the joystick 24 in the positive direction along the Y-axis moves the marine vessel 10 forward while moving the joystick 24 in the negative direction along the Y-axis moves the marine vessel 10 in reverse. Rotational movement of the joystick 24 about a θ-axis rotates the marine vessel 10 starboard or port. The joystick 24 is accordingly operable in a neutral zone $Z_0$, a forward zone $Z_1$, a starboard zone $Z_2$, a reverse zone $Z_3$, a port zone $Z_4$ and a rotation zone $Z_5$. The joystick 24 is also moveable along the X-axis and the Y-axis, and about the θ-axis to allow for vector thrusting. The joystick 24 may further be used to provide any combination of partial or full X-axis, Y-axis and θ-axis commands. Movement of the joystick 24 as described above signals a pump control module 26, shown in FIG. 1, to pump hydraulic fluid to respective hydraulic actuators 28 and 30 of the port engine 12 and the starboard engine 14 based on the movement of the joystick 24. Steering motion is thereby imparted by the hydraulic actuators 28 and 30 to corresponding ones of the port engine 12 and the starboard engine 14 in a manner well known in the art.

It may be desired to maintain a position of the marine vessel 10 relative to a reference point such as a buoy, an underwater wreck or reef, a shoreline, another vessel or a dock. Unless there is no disturbance, i.e. external interruption from the environment such as a current and/or a wind, maintaining the position (station keeping) without an anchor normally requires active control of the marine vessel. Manual station keeping may be achieved by an operator observing movement of the marine vessel 10 relative to the reference point and using the joystick 24 to steer the marine vessel to counteract the disturbance in order to hold the position of the marine vessel. However, there may be a limited number of operators aboard the marine vessel. In order to maximize time on the water and to allow the operator(s) to catch as many fish as possible, it may be desirable to automatically maintain the position of the marine vessel.

In an automatic station keeping system, the operator is replaced with electronic sensors which measure the movement of the marine vessel and control algorithms which calculate appropriate counteracting port and starboard engine thrusts in order to maintain the position of the marine vessel. The electronic sensors may include a Global Positioning System (GPS) receiver for measuring the absolute position of the marine vessel, an accelerometer for measuring the attitude (pitch and roll) of the marine vessel, a gyroscope for measuring the horizontal rate of turn of the marine vessel and/or a magnetometer for determining a heading direction of the marine vessel. These sensors are used in combination to define a compensated global position and a compensated heading direction of the marine vessel. An inertia measurement unit may also be used to provide compensated heading information.

In this example, the marine vessel 10 includes an electronic sensor in the form of a GPS compass 32 as shown in FIG. 1. The GPS compass 32 provides position and heading information to an automatic station keeping (ASK) controller 34. The GPS compass 32 in this example uses a single GPS receiver and two antennas (a primary antenna and a secondary antenna) for satellite signal processing. The global position of the marine vessel 10 is computed by the GPS compass 32 in reference to a phase center of the primary antenna. The heading direction of the marine vessel 10 is derived from the vector formed from the primary antenna to a phase center of the secondary antenna.

Figure 3:
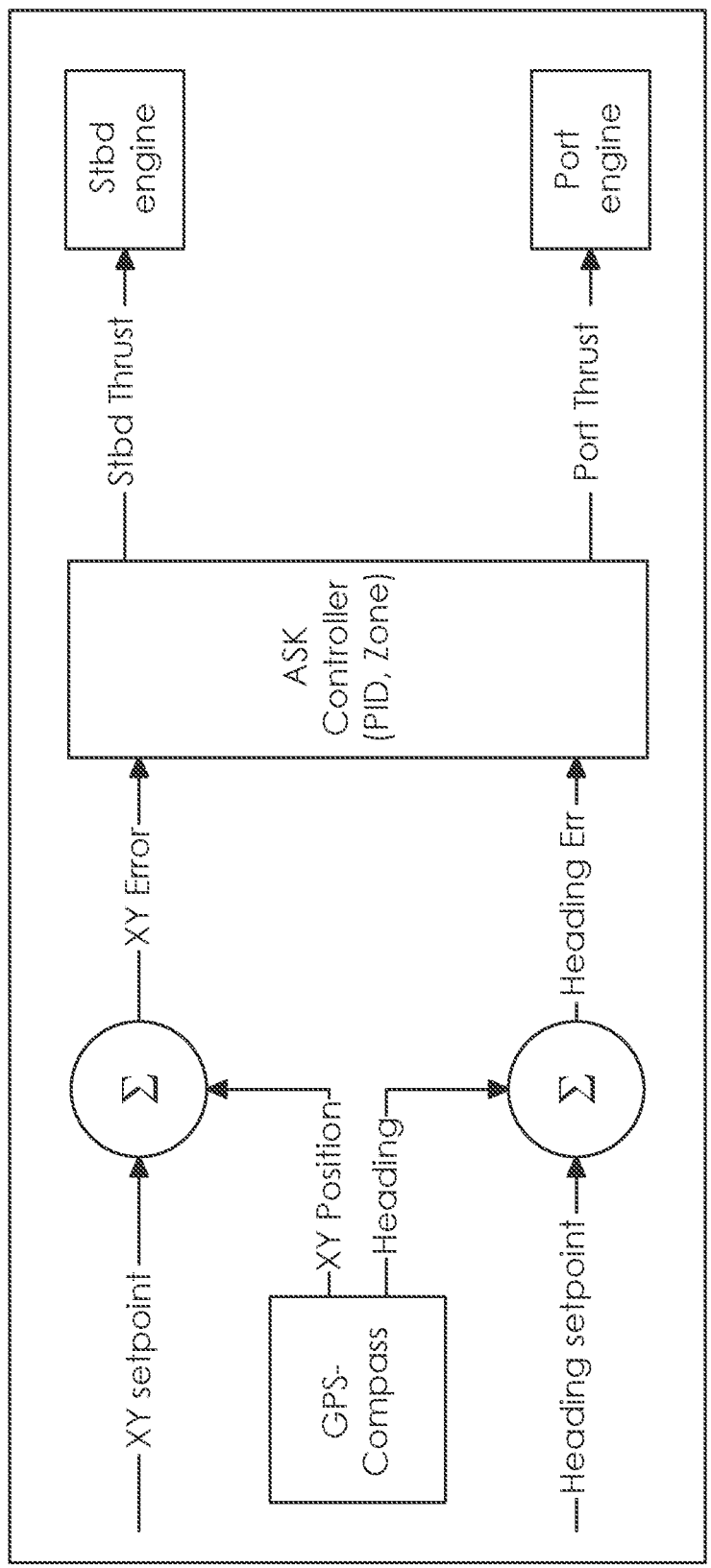
FIG. 3 is a schematic diagram showing the logic of a software algorithm which maintains a global position and a heading of the marine vessel of FIG. 1.

The ASK controller 34 uses three proportional-integral-derivative (PID) controllers to maintain the position of the marine vessel 10. The three PID controllers correspond to the three axes of movement: X-axis, Y-axis and θ-axis. Each PID controller has different sets of gains depending on the operation zone. The ASK controller 34 is further provided with software having an algorithm for maintaining a position and a heading of the marine vessel 10. FIG. 3 is a schematic diagram showing the logic of the algorithm. The position and heading information of the marine vessel 10 obtained from the GPS compass 32 is compared with set points which are established when the ASK controller 34 is engaged. The differences between current position values and the set points generate errors which are used by the ASK controller 34 to generate counteracting thrust commands for the port engine 12 and the starboard engine 14. The X-axis, Y-axis and θ-axis thrust commands can be converted into shift, throttle, and steering angle commands for each engine.

Figure 4:
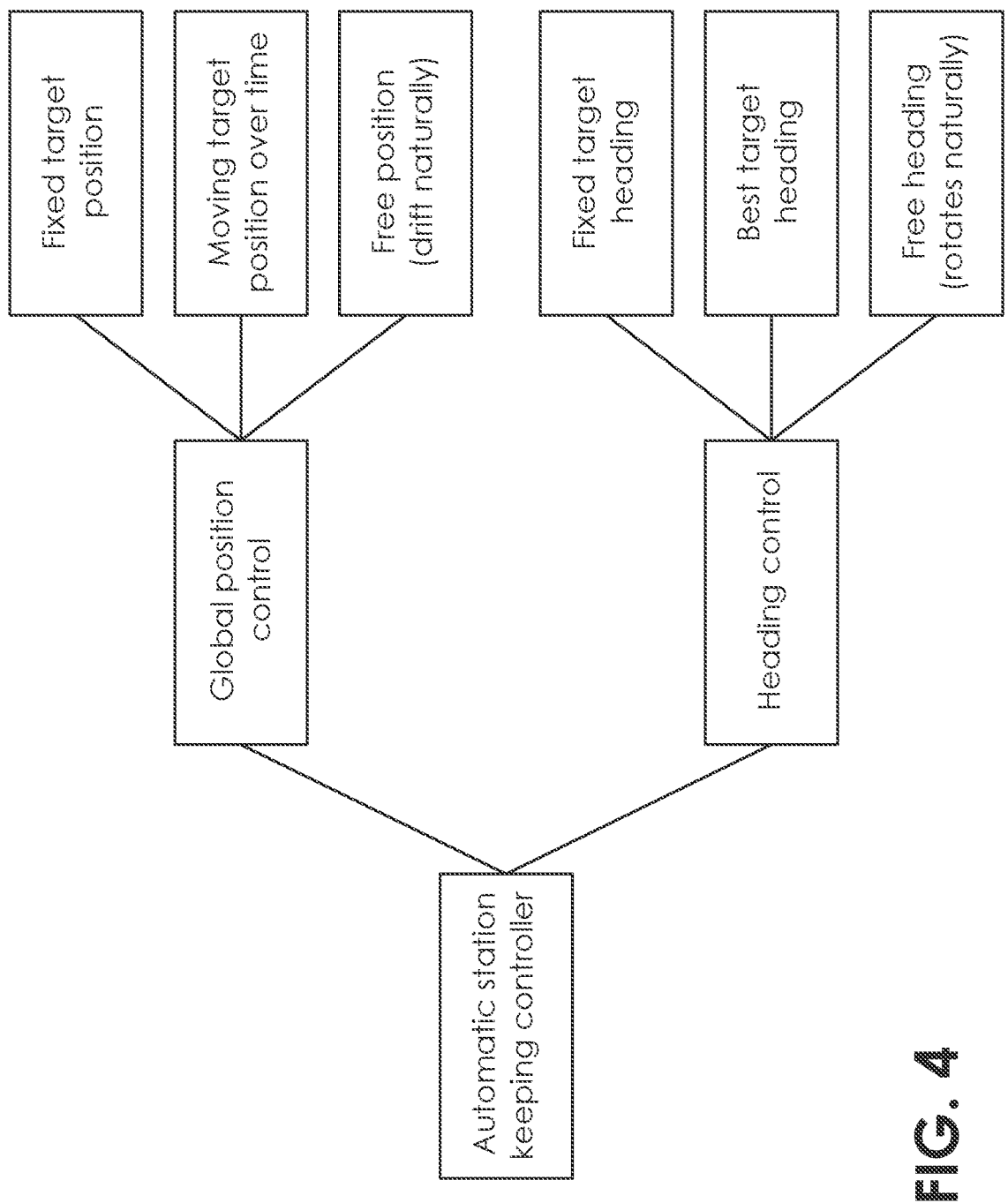
FIG. 4 is a flowchart showing the logic of controlling a global position and a heading of the marine vessel of FIG. 1.

As shown in FIG. 4, a global position and a heading of the marine vessel 10 are controlled separately by the ASK controller 34. The global position of the marine vessel may be set to have a fixed target position or a target position which moves over time. Alternatively, the global position control may be disabled to allow the marine vessel to drift naturally. The heading of the marine vessel may be set to have a fixed target heading or a pre-programmable optimal or best heading. Alternatively, the heading control may be disabled to allow the heading to rotate freely. The global position control and heading control may be combined into different combinations to achieve a variety of settings for marine vessel control. For example, the global position control may be set to a fixed target position and the heading control may be set to a fixed target heading. The result is similar to traditional automatic station keeping.

The best heading command refers to the heading command which provides the best engine efficiency and best heading stability. In one instance, the best heading command may be set to a steady state thrust angle ($\alpha_{ss}$) which is the vector sum of the integral term of the X-axis PID controller and the integral term of the Y-axis PID controller. In order to ensure that the integral terms of the X-axis and Y-axis PID controllers continue to point towards the steady state disturbance, the X-axis and Y-axis PID controllers are rotated as the heading of the marine vessel changes. This restricts movement of the marine vessel away from the target position as the marine vessel rotates.

Figure 5C:
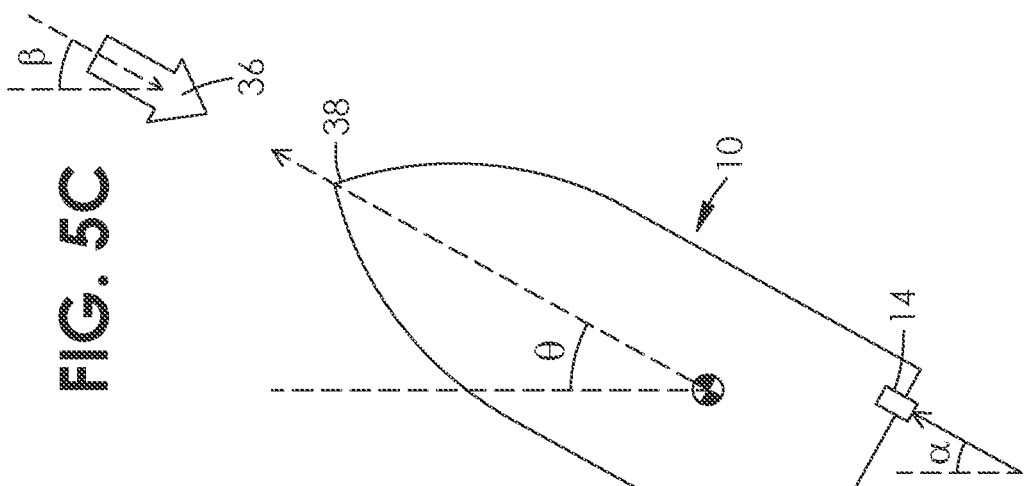
FIGS. 5A to 5C are schematic diagrams showing the marine vessel of FIG. 1 rotating to align a heading of the marine vessel against a direction of a disturbance.
Figure 5B:
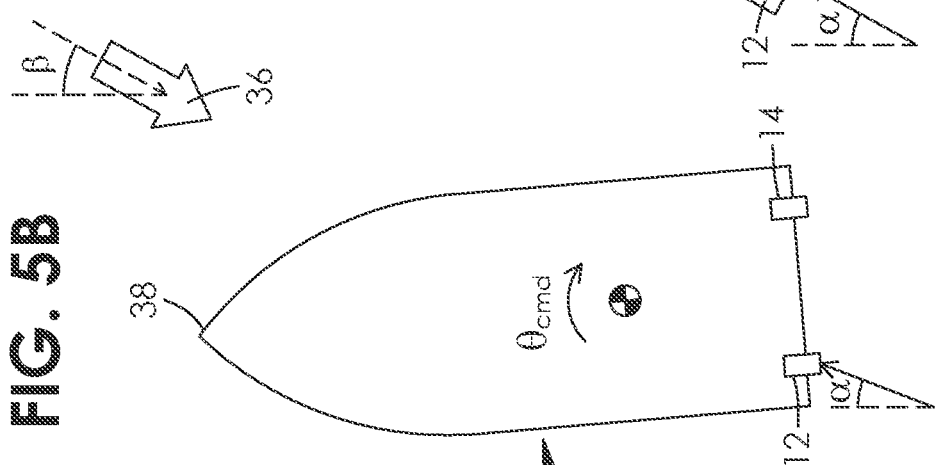
Figure 5A:
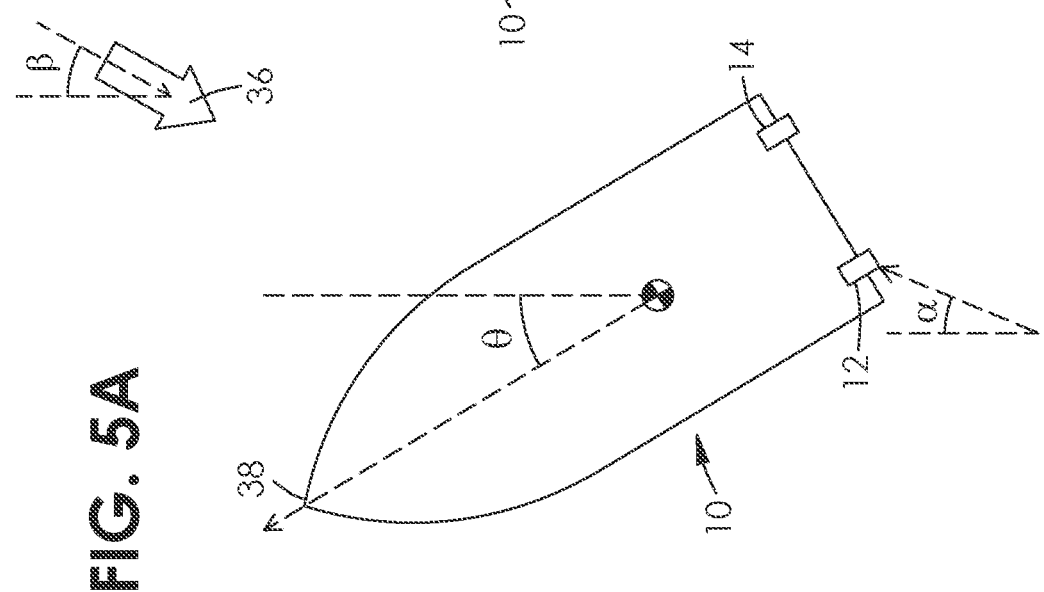

FIGS. 5A to 5C show an example where the global position control is set to a fixed target position and the heading control is set to the best heading. The ASK controller 34, shown in FIG. 1, monitors a direction of a disturbance 36, such as a current or a wind, applied to the marine vessel 10. If the ASK controller 34 detects that a heading angle θ of the marine vessel 10 is different from a disturbance angle β of the disturbance 36 as shown in FIG. 5A, the ASK controller 34 gradually rotates the marine vessel 10 to align a heading 38 of the marine vessel 10 against the direction of the disturbance 36 such that the heading angle θ is equal to the disturbance angle β. In this example, the ASK controller 34 signals the port engine 12 to generate a thrust and rotates the marine vessel 10 by setting a vessel heading command $\theta_{cmd}$ to equal a thrust angle $\alpha$ as shown in FIG. 5B. The marine vessel 10 reaches a steady state when the thrust angle $\alpha$, the disturbance angle $\beta$ and the heading angle $\theta$ are equal to one another as shown in FIG. 5C. One or both of the engines 12 and 14 provide forward thrusts which are equal in magnitude and opposite in direction to the disturbance 36, thereby maintaining the marine vessel 10 in the fixed target position. The equality of the angles and thrusts can be time-averaged or filtered to fit the bandwidth of the vessel weight and vessel motion. The equality can be approximated to fit the deadband and sensitivity of the vessel motion. It will be understood by a person skilled in the art that although the marine vessel 10 is described above as having two engines that the marine vessel may be provided with any suitable number of engines.

Figure 6A:
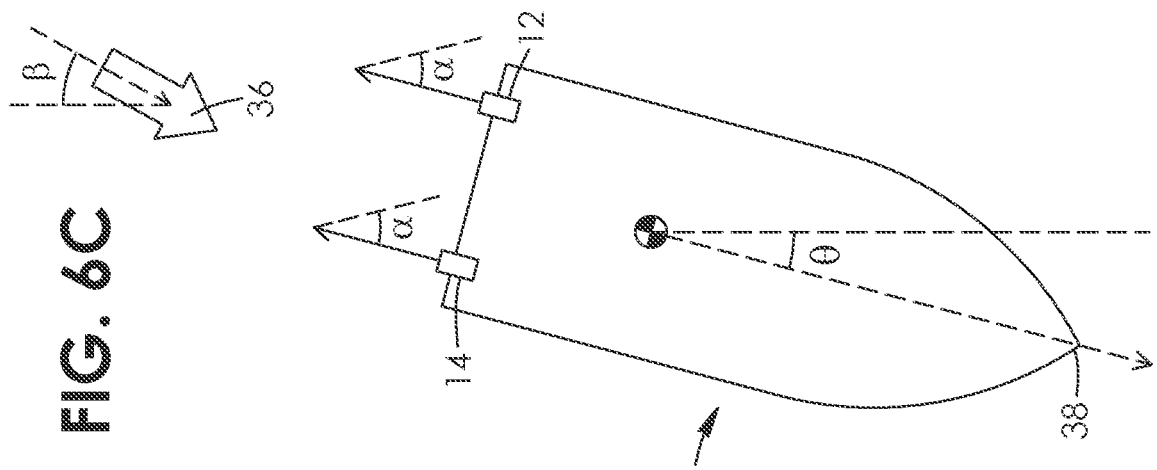
FIGS. 6A to 6C are schematic diagrams showing the marine vessel of FIG. 1 rotating to align the heading of the marine vessel in the direction of the disturbance.
Figure 6B:
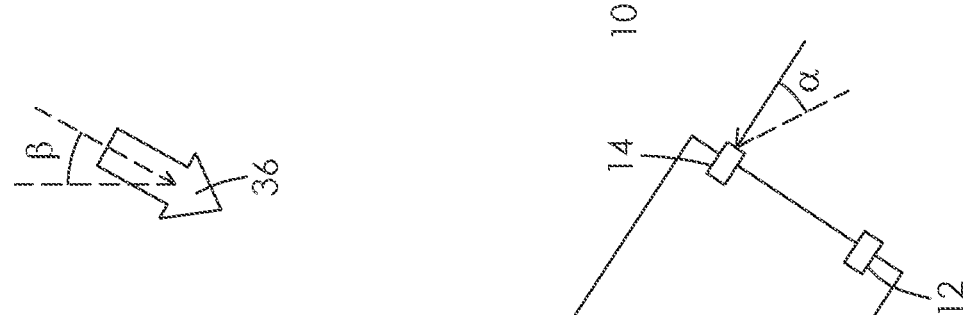
Figure 6C:
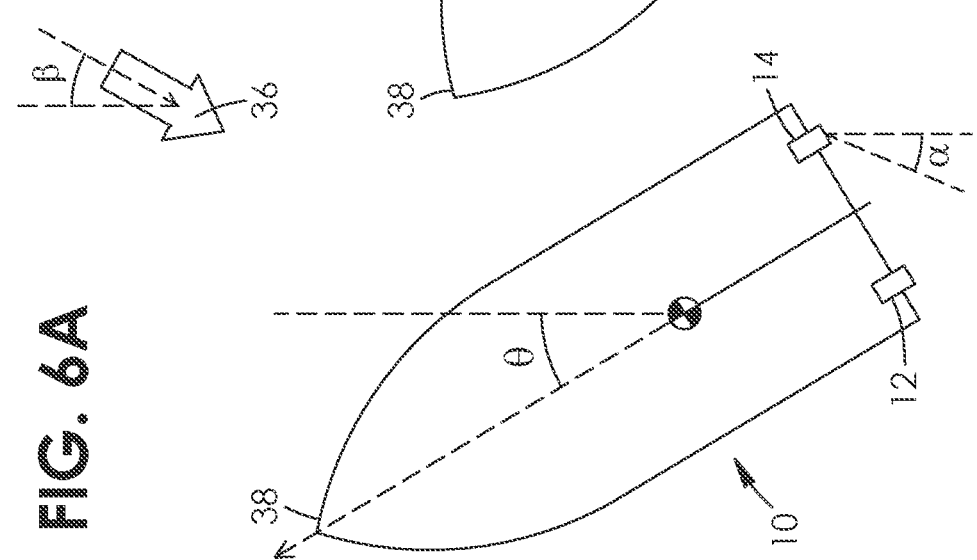

FIGS. 6A to 6C show another example where the global position control is set to a fixed target position and the heading control is set to the best heading. However, in this example, the ASK controller 34 gradually rotates the marine vessel 10 to align the heading 38 of the marine vessel in the direction of the disturbance 36. In other words, the ASK controller 34 signals the starboard engine 14 to generate a thrust and rotates the marine vessel 10 by setting a vessel heading command $\theta_{cmd}$ (180°+$\beta$) to equal a thrust angle $\alpha$ as shown in FIG. 6B. The marine vessel 10 reaches a steady state when the thrust angle $\alpha$, the disturbance angle $\beta$ and the heading angle $\theta$ are equal to one another as shown in FIG. 6C. One or both of the engines 12 and 14 provide reverse thrusts which are equal in magnitude and opposite in direction to the disturbance 36, thereby maintaining the marine vessel 10 in the fixed target position.

In the examples shown in FIGS. 5A to 5C and FIGS. 6A to 6B, the engines 12 and 14 provide thrusts in the forward, neutral and reverse directions most of the time, which are the most efficient directions for operation of the engines. In the forward or reverse direction, all engines thrusts contribute to marine vessel movement. Since the marine vessel is most efficient in the forward or reverse directions, the ASK controller 34 can maintain a global position in situations where other traditional station keeping systems may not.

Figure 7:
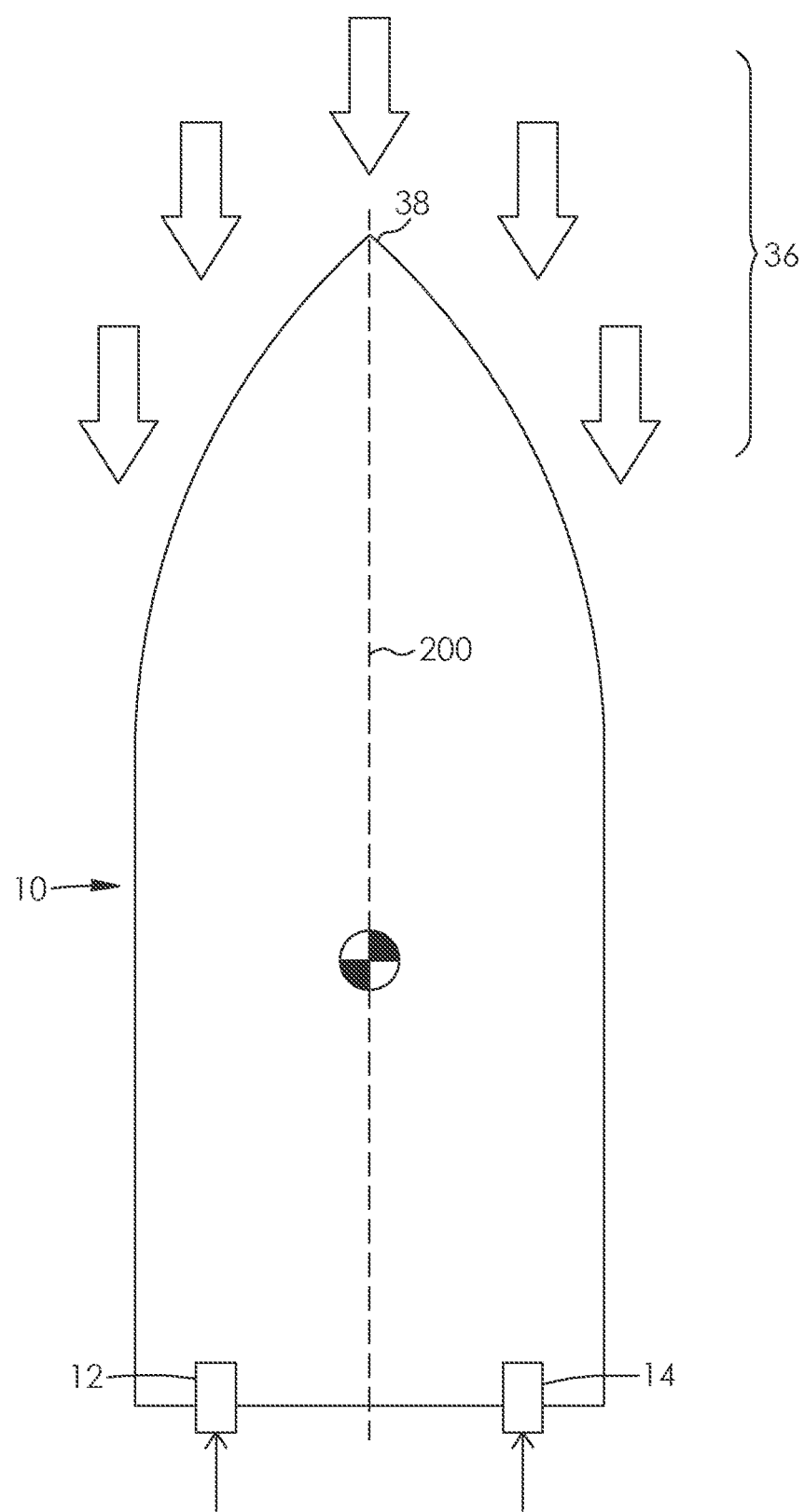
FIG. 7 is a schematic diagram showing the disturbance acting against the heading of the marine vessel of FIG. 1.

Furthermore, when the heading 38 of the marine vessel 10 is facing against the direction of the disturbance 36, as shown in FIG. 5C, or facing in the same direction of the disturbance 36, as shown in FIG. 6C, the disturbance 36 is applied equally and symmetrically to both sides of the marine vessel 10. As shown in FIG. 7, when the disturbance is acting against the direction of the heading 38, the force of the disturbance 36 is applied equally and symmetrically to the marine vessel 10 relative to a centerline 200 of the marine vessel. This is particularly useful when there is a strong disturbance such as a strong wind or a strong current like in a river. The forward or reverse engine thrusts are strong enough to fight this strong disturbance.

Figure 8:
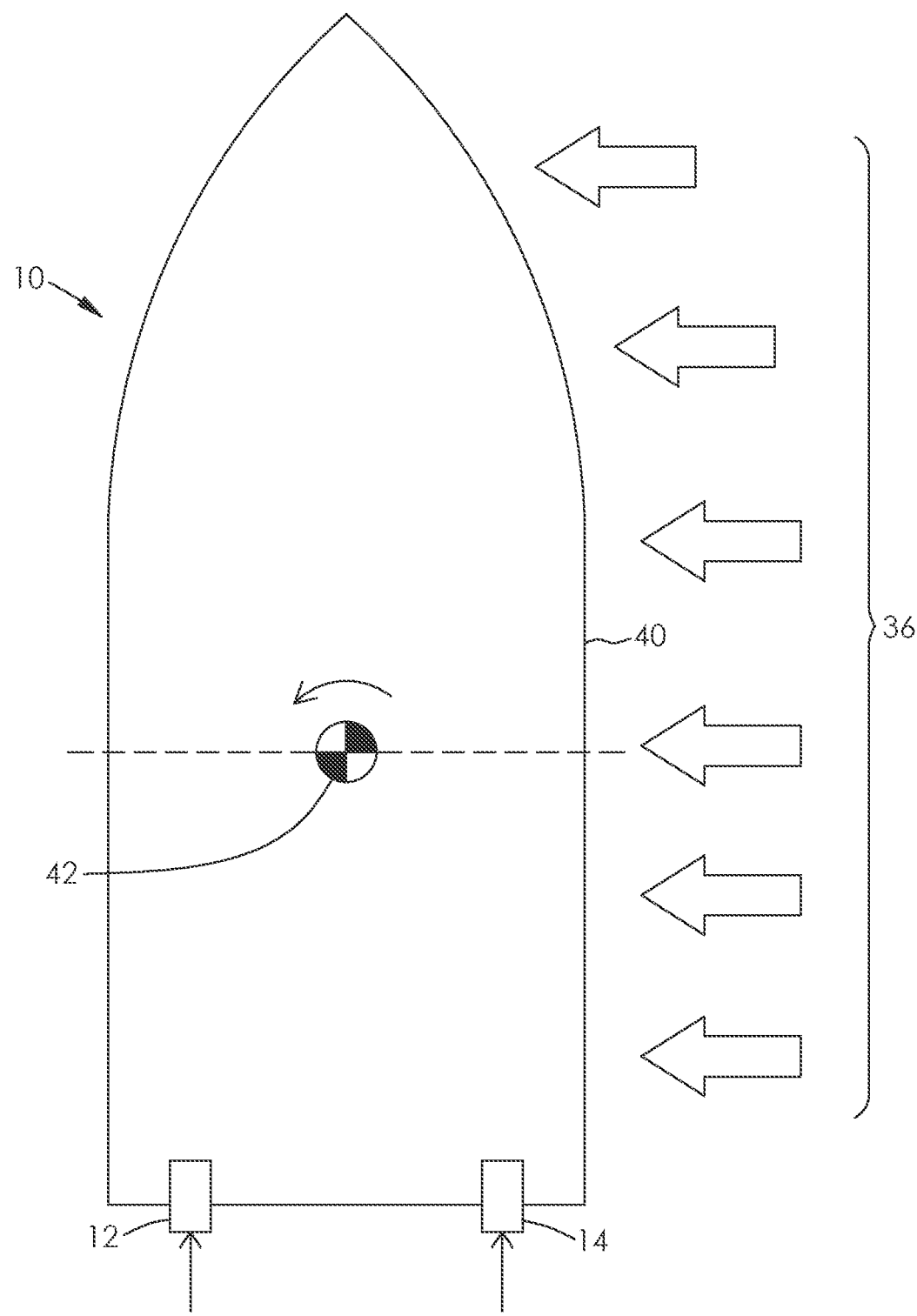
FIG. 8 is a schematic diagram showing the disturbance acting on a side of the marine vessel of FIG. 1.
Figure 9:
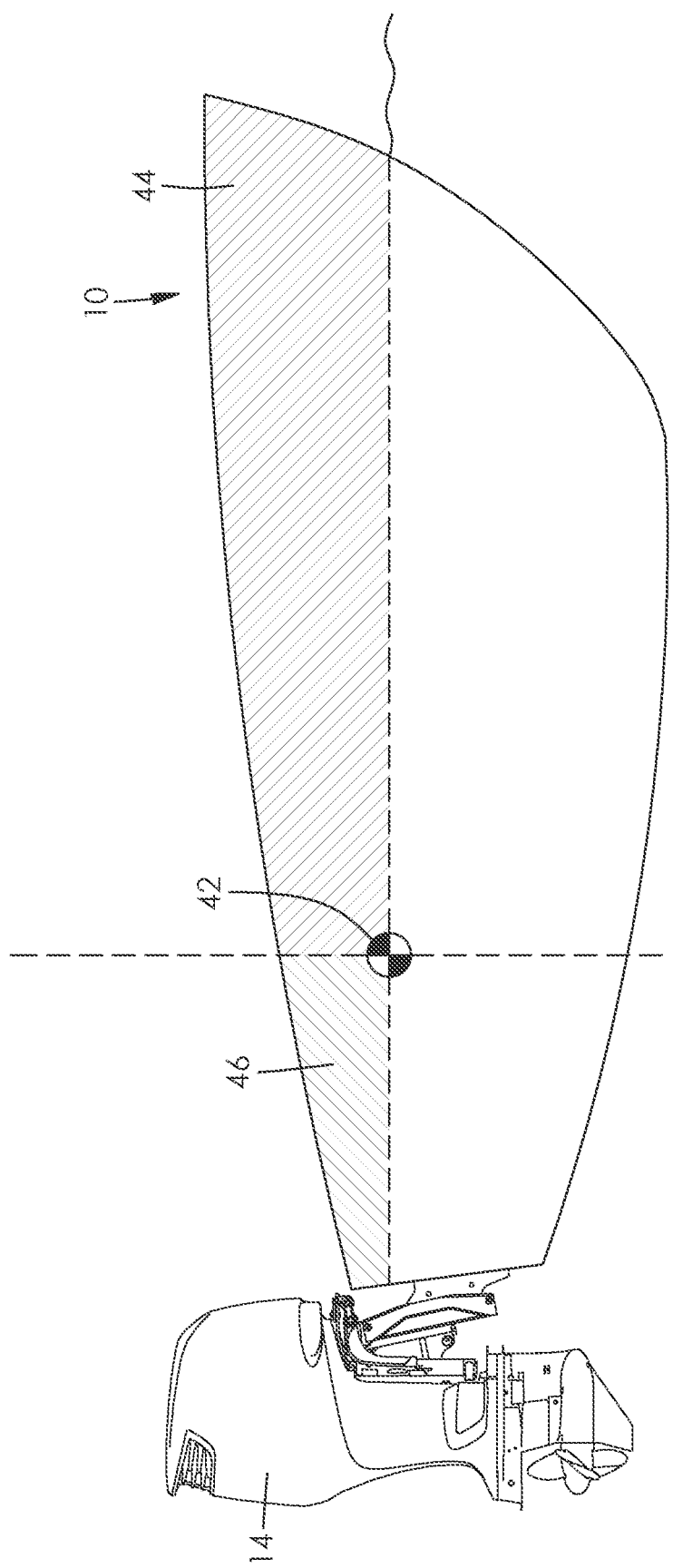
FIG. 9 is another schematic diagram showing the disturbance acting on the side of the marine vessel of FIG. 1.

In contrast, when the disturbance 36 is acting on a side, for example, a starboard side 40 of the marine vessel 10 as shown in FIG. 8, the disturbance 36 will usually create a turning moment to rotate the marine vessel. This is because an area moment of inertia of a wind area 44 fore of a center of rotation 42 of the marine vessel 10 is typically different than an area moment of inertia of a wind area 46 aft of the center of rotation 42 due to lateral water resistance as shown in FIG. 9. When a strong wind acts on the side of the marine vessel, the marine vessel inherently catches some unbalanced rotational force as the windage on one side of the axis of rotation of the marine vessel is different than the windage on the opposite side of the axis of rotation of the marine vessel. Furthermore, traditional vector thrusting is limited due to its inefficiency since some engine thrusts are cancelled in the sideway zone.

Figure 10B:
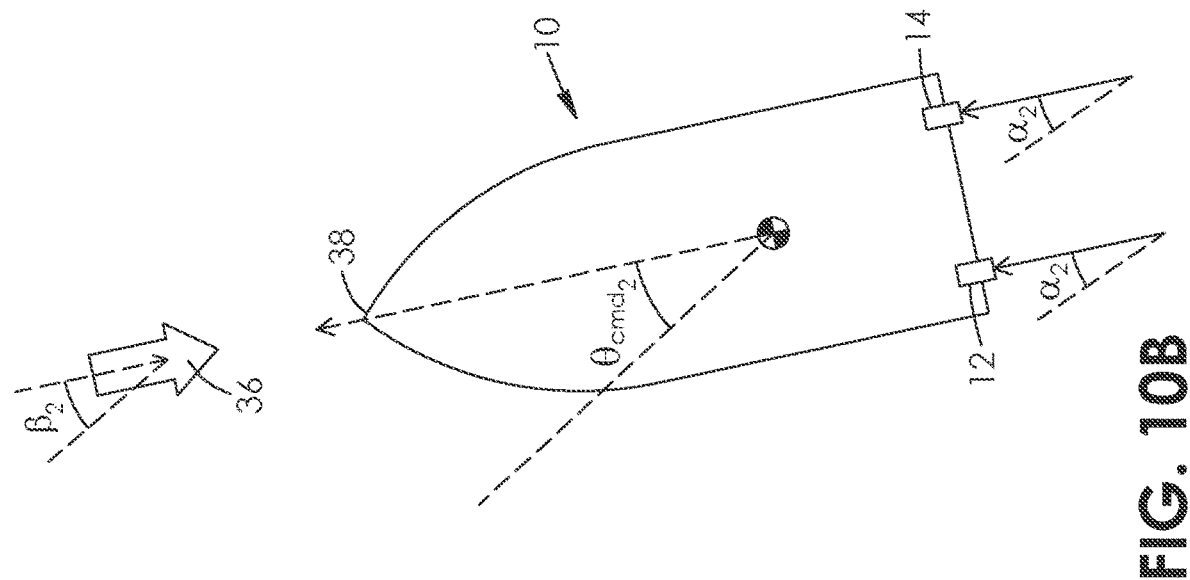
FIGS. 10A and 10B are schematic diagrams showing the marine vessel of FIG. 1 rotating to align its heading against a new direction of the disturbance.
Figure 10A:
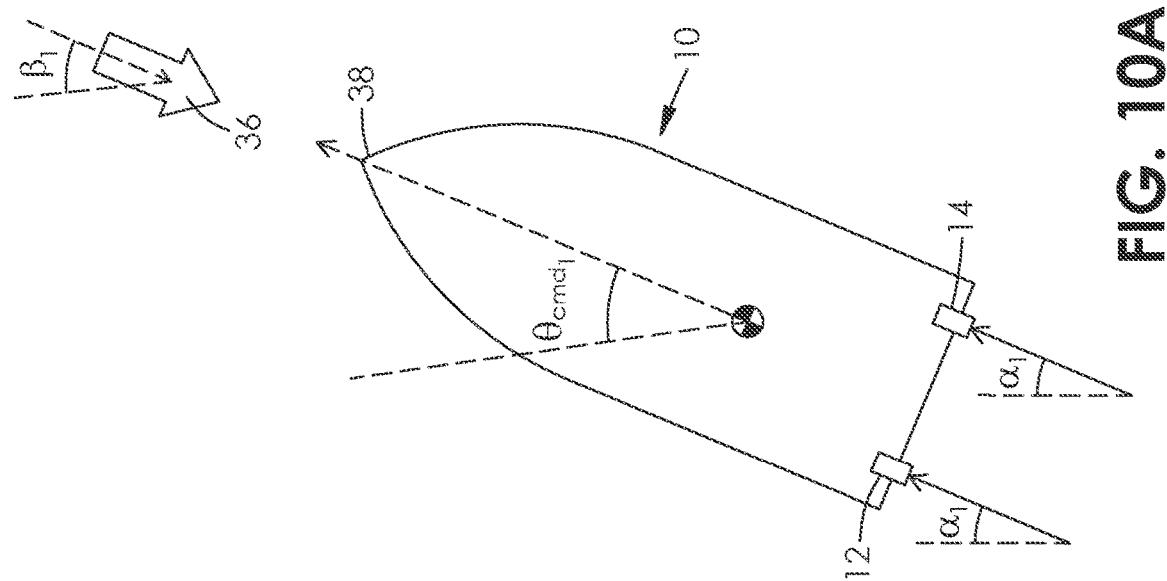

However, there are instances where the disturbance angle may change. Referring now to FIG. 10A, the marine vessel 10 is initially at a steady state where the heading command $\theta_{cmd1}$ is equal to the disturbance angle $\beta_1$. The integral term of the thrust traditionally requires position error accumulation over time. The integral term increases over time until it is equal to the disturbance. However, as shown in FIG. 10B, the disturbance angle may change from $\beta_1$ to $\beta_2$. In the best heading control mode, the target heading $\theta_{cmd1}$ is rotated to $\theta_{cmd2}$ by either 1) waiting for the PID integral terms to adapt and build up to oppose the new disturbance direction, or 2) detecting a small XY error change to change the $\theta$ thrust command. The X and Y thrust commands relative to the marine vessel can remain the same.

However, instead of waiting for the position error to accumulate over time, a rotation can be applied to the integral term vector$_1$ with the same amplitude to become the new heading command $\theta_{cmd2}$. The heading command $\theta_{cmd2}$ is equal to the disturbance angle $\beta_2$. Since the heading command $\theta_{cmd2}$, the disturbance angle $\beta_2$ and the thrust angle $\alpha_2$ are equal to one another, with the engines 12 and 14 providing forward thrusts which are equal in magnitude and opposite in direction to the disturbance 36, the marine vessel 10 is maintained in the fixed target position even with a change in direction of the disturbance.

Figure 11:
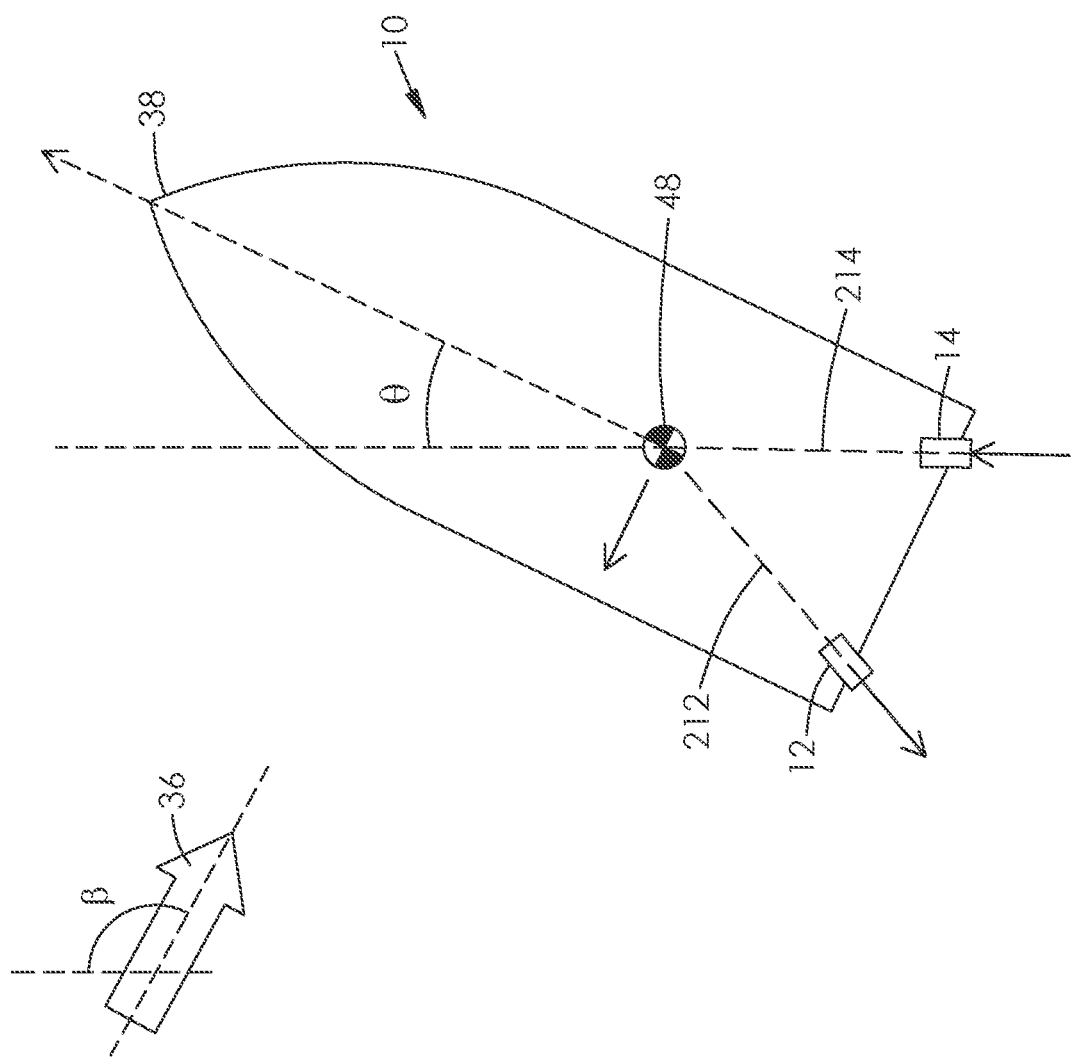
FIG. 11 is a schematic diagram showing longitudinal axes of the propulsion units intersecting with an instantaneous center of rotation of the marine vessel of FIG. 1.

Referring now to FIG. 11, there is shown an example where the global position control is set to a fixed target position and the heading control is disabled to allow the heading to rotate freely. The steering angles of the engines are set such that respective longitudinal axes 212 and 214 of the engines 12 and 14 intersect with an instantaneous center of rotation 48 of the marine vessel 10 as the port engine 12 is in reverse and the starboard engine 14 is in forward. The sum of the two engine thrusts cancels the force of the disturbance 36 such that the marine vessel 10 maintains the fixed target position. Since the heading control is disabled, the heading 38 of the marine vessel 10 is free to rotate to find the most stable heading due to the wind area effect. Free rotation of the heading is naturally stable in the steady state as the windage and the current disturbance rotate the marine vessel until the rotation force is balanced. Free rotation of the heading also results in very quiet operation as the shift actuators, and thus the engine gear shifters, maintain the same gear positions and the steering angles remain the same.

Figure 12:
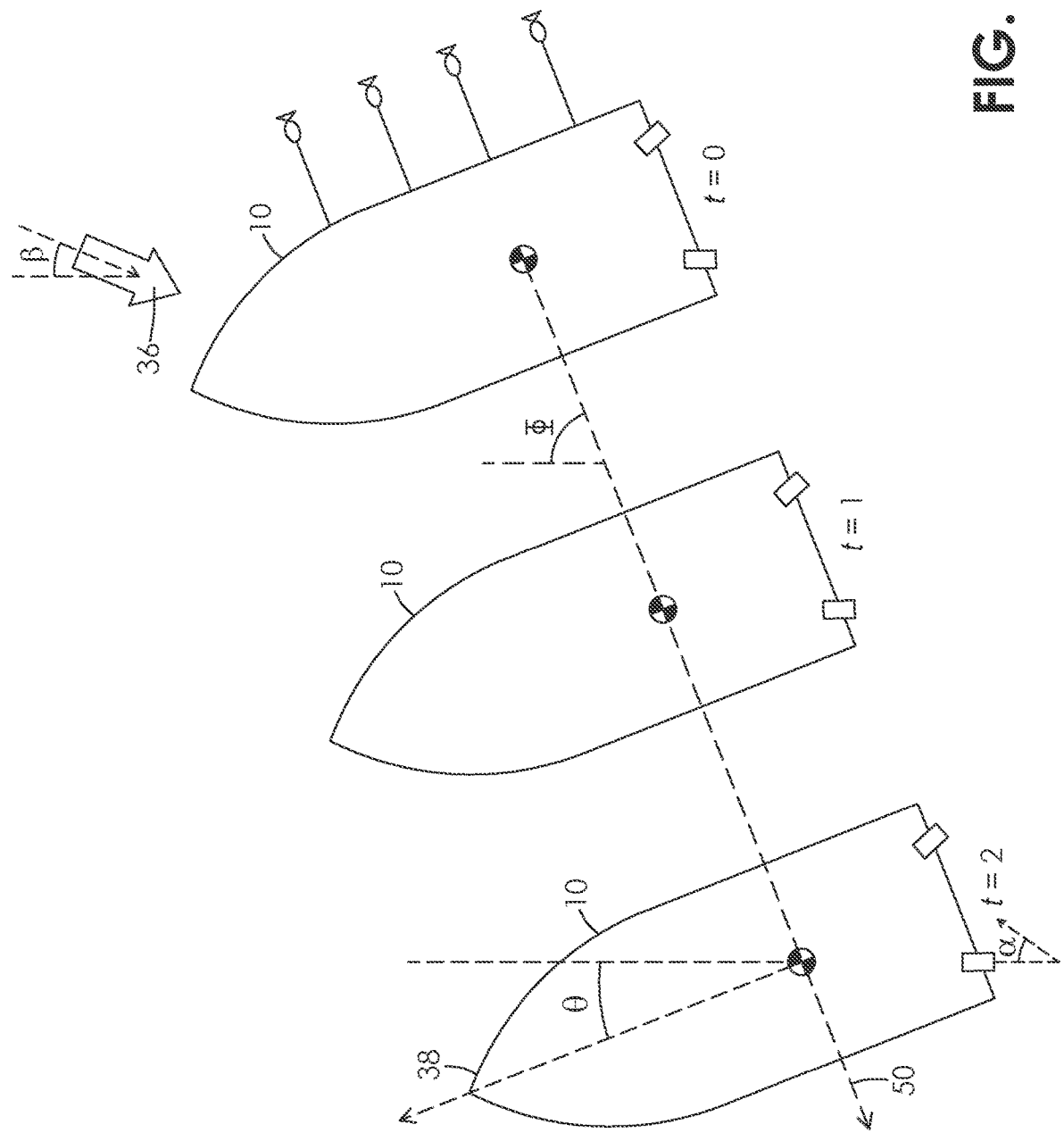
FIG. 12 is a schematic diagram showing the marine vessel of FIG. 1 drifting along a course.

Traditional autopilot systems keep the marine vessel course (the intended path of vessel motion) in the forward direction without vector thrusting. The heading of the marine vessel is therefore dependent on the vessel course and on the angle of the disturbance. However, in the present invention, the heading of the marine vessel can be set independently of the marine vessel course. FIG. 12 shows an example where the global position control is disabled and the heading control is set to a fixed target heading. Since the position control is disabled, the marine vessel 10 is allowed to drift naturally as a result of a wind or a current. The heading angle $\theta$ is set independently of a course angle $\Phi$. As a result, the heading 38 may be very different from a direction of a course 50. The $\theta$ thrust command is provided to the joystick 24 by the $\theta$-axis PID controller. This mode is useful to avoid tangling fishing lines during kite fishing or drift fishing as the marine vessel 10 drifts at the same speed of the disturbance 36 while maintaining the heading 38. The fishing lines can also be further away from the engines 12 and 14. Alternatively, the course speed may be controlled. Small heading corrections can be achieved by generating a small thrust from one of the engines. For example, the marine vessel 10 may be rotated slightly starboard by generating a thrust from the port engine 12. By using only the rotational zone and neutral zone of the joystick 24, the engines 12 and 14 can be efficiently controlled.

Figure 13:
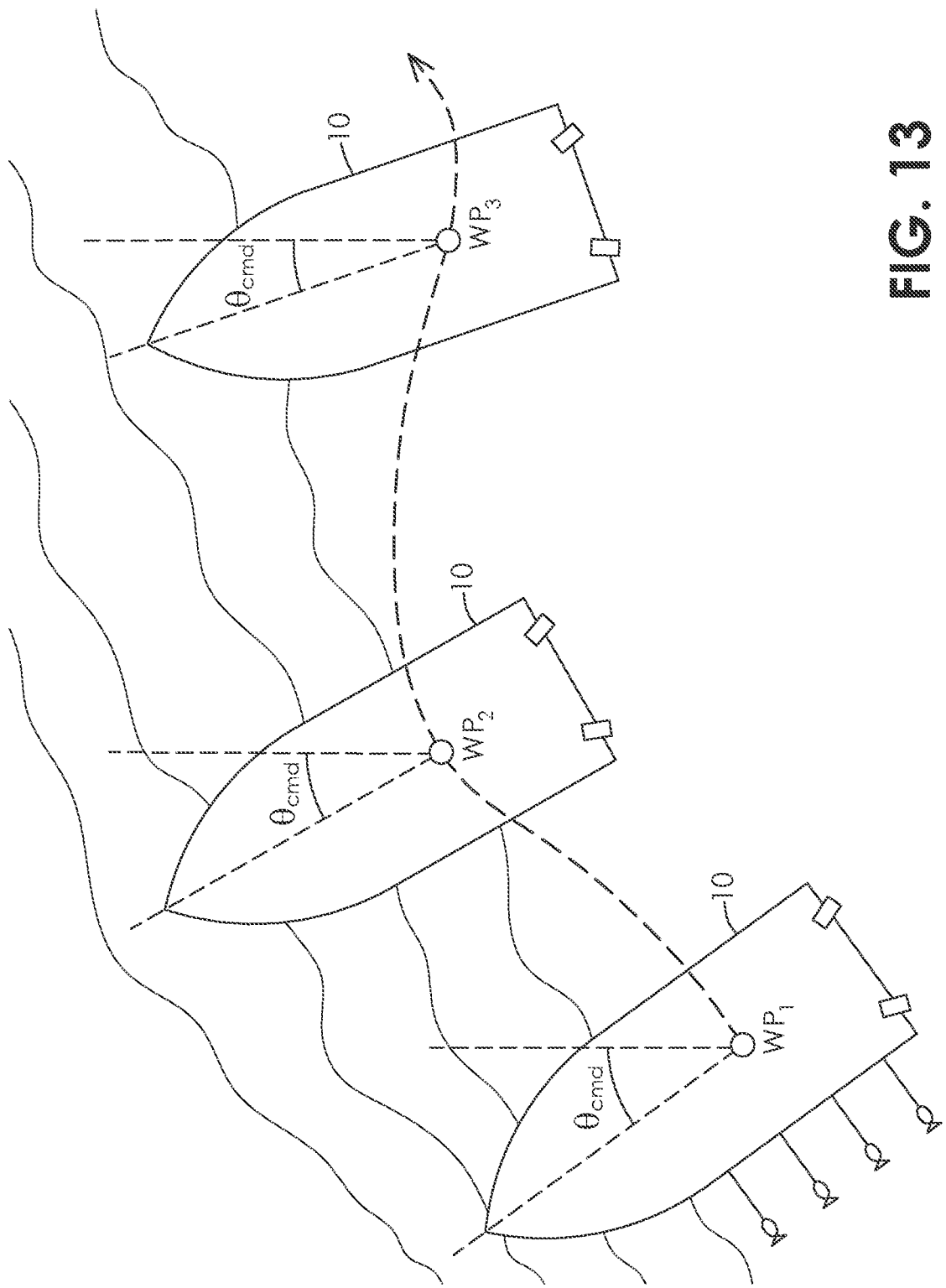
FIG. 13 is a schematic diagram showing the marine vessel of FIG. 1 following a waypoint course.

FIG. 13 shows an example where the global position control is set to a target position which moves over time and the heading control is set to a fixed target heading. When the target position moves at a constant speed over time at a particular course over ground, the target position and the heading direction can be entered by an operator by using the joystick 24. The operator moves the joystick 24 to add incremental speed and directional commands. The operator rotates the joystick 24 to add incremental heading commands. The ASK controller 34 can also receive waypoint information from a chart plotter through a standard network such as NMEA 2000. As shown in FIG. 13, the heading command $\theta_{cmd}$ may be fixed and the marine vessel may follow the marine vessel course through waypoints $WP_1$, $WP_2$ and $WP_3$. The waypoint information may represent certain fishing patterns, a course over ground, a course over water, topological map information such as a constant depth following a ledge, or fishing areas such as underwater reefs or wrecks. The ASK controller 34 will close the loop with the waypoint course but independent heading control and all joystick zones control will remain available.

Figure 14:
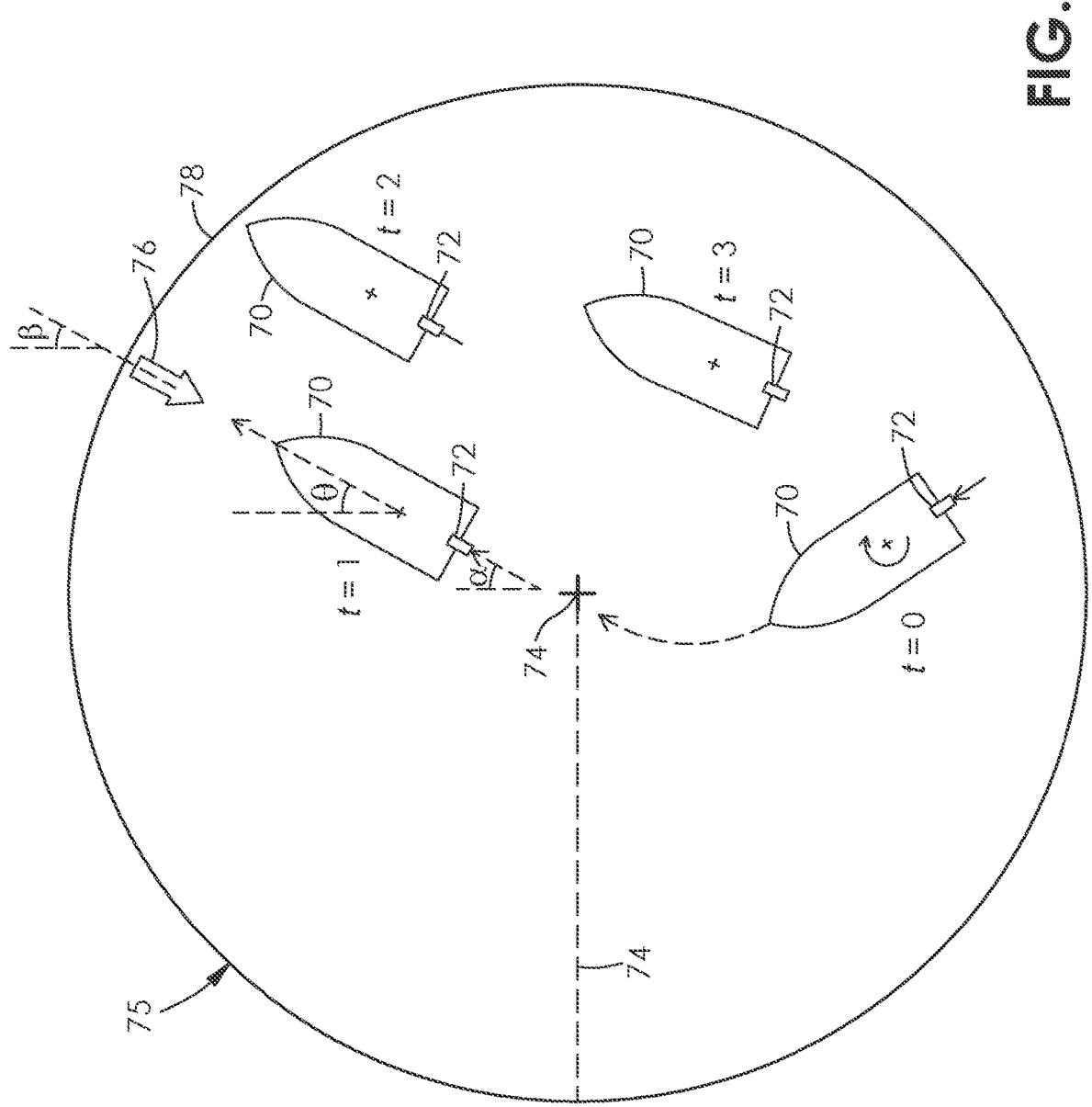
FIG. 14 is a schematic diagram showing a marine vessel provided with a single propulsion unit, the marine vessel being held near a target position with a target position range.

Referring now to FIG. 14, there is shown a marine vessel 70 which is substantially the same as the marine vessel 10 described above with the exception that the marine vessel 70 is provided with a single propulsion unit in the form of an outboard engine 72. The marine vessel 70 is held near a target position 74 with a target position range having a radius 77. At t=0, the ASK controller (not shown) commands a thrust and a turning moment to drive and steer the marine vessel 70 forwardly towards a boundary 78 of the target position range 75 and against a direction of a disturbance 76. At t=1, a heading angle $\theta$ and a thrust angle $\alpha$ of the marine vessel 70 are equal to a disturbance angle $\beta$ of the disturbance 76. At t=2, the marine vessel 70 reaches the boundary 78 of the target position range 75. The thrust of the engine 72 is then turned off or reduced to allow the marine vessel 70 to drift backwards and away from the boundary 78 of the target position range 75 due to the force of the disturbance 76. Alternatively, the gear may be shifted to neutral to provide the marine vessel 70 with a very slight reverse motion. At t=3, the marine vessel 70 drifts towards the opposite side of the boundary 78 of the target position range 75. The process described above then repeats in order to maintain the marine vessel 70 within the target position range 75. This mode of operation requires less shifting and fuel consumption compared to traditional station keeping systems. The single engine marine vessel uses a larger target position range as it uses forward and reverse movements with some amount of steering to correcting heading errors.

The station keeping system with a single propulsion unit as described above is significantly different than a traditional station keeping system with a trolling motor. The outboard engine 72 has a limited range of steering angle, such as +/−30° from a center steering position. The system presented in FIG. 14 rotates the vessel heading to use the engine thrust to cancel the disturbance force. The trolling motor itself can rotate 360° to align the propeller thrust directly to cancel the disturbance force. The vessel heading of the trolling motor system is not under control.

Figure 15A:
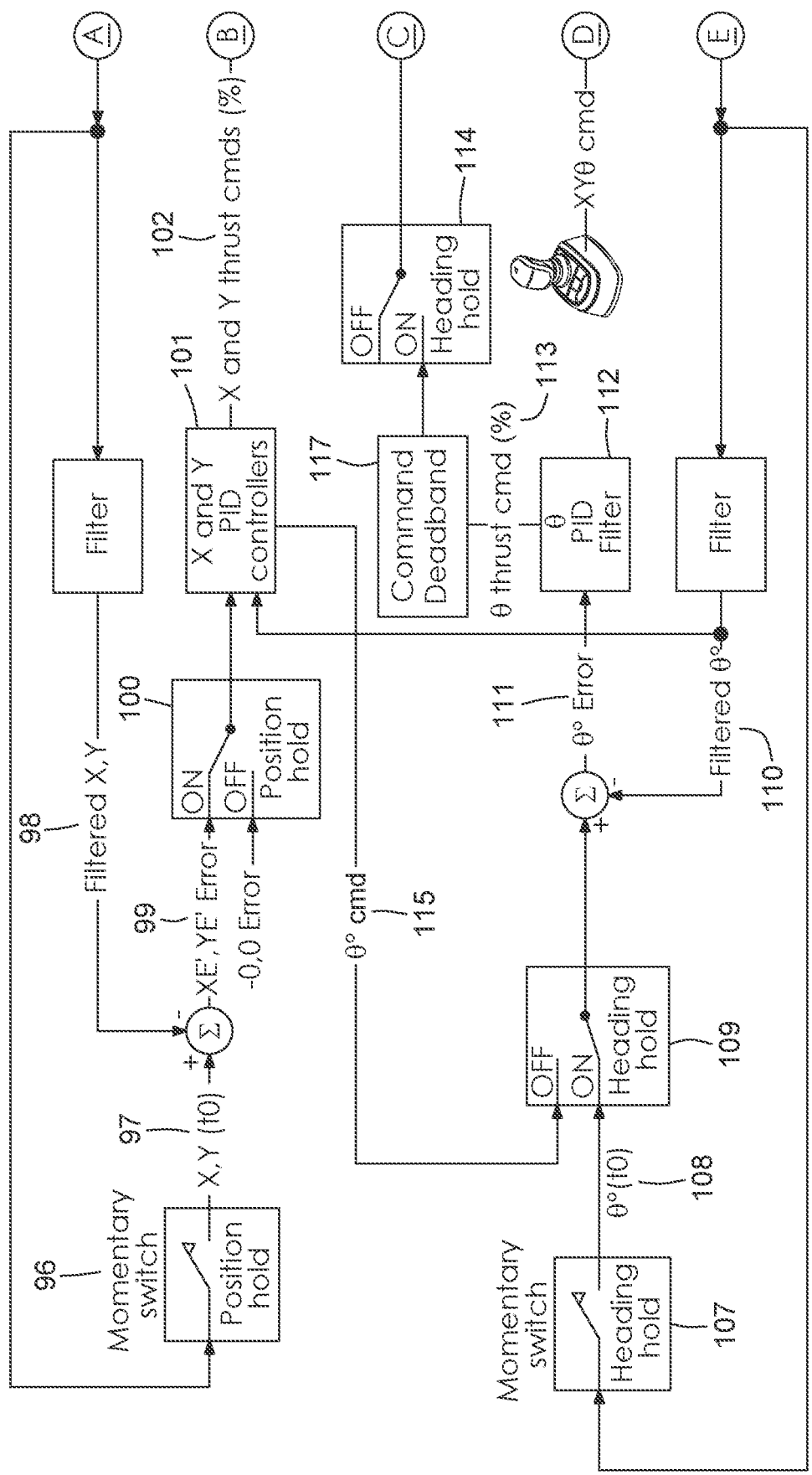
FIG. 15 is a schematic diagram showing the software logic of controlling a global position and a heading of the marine vessel of FIG. 1.
Figure 15B:
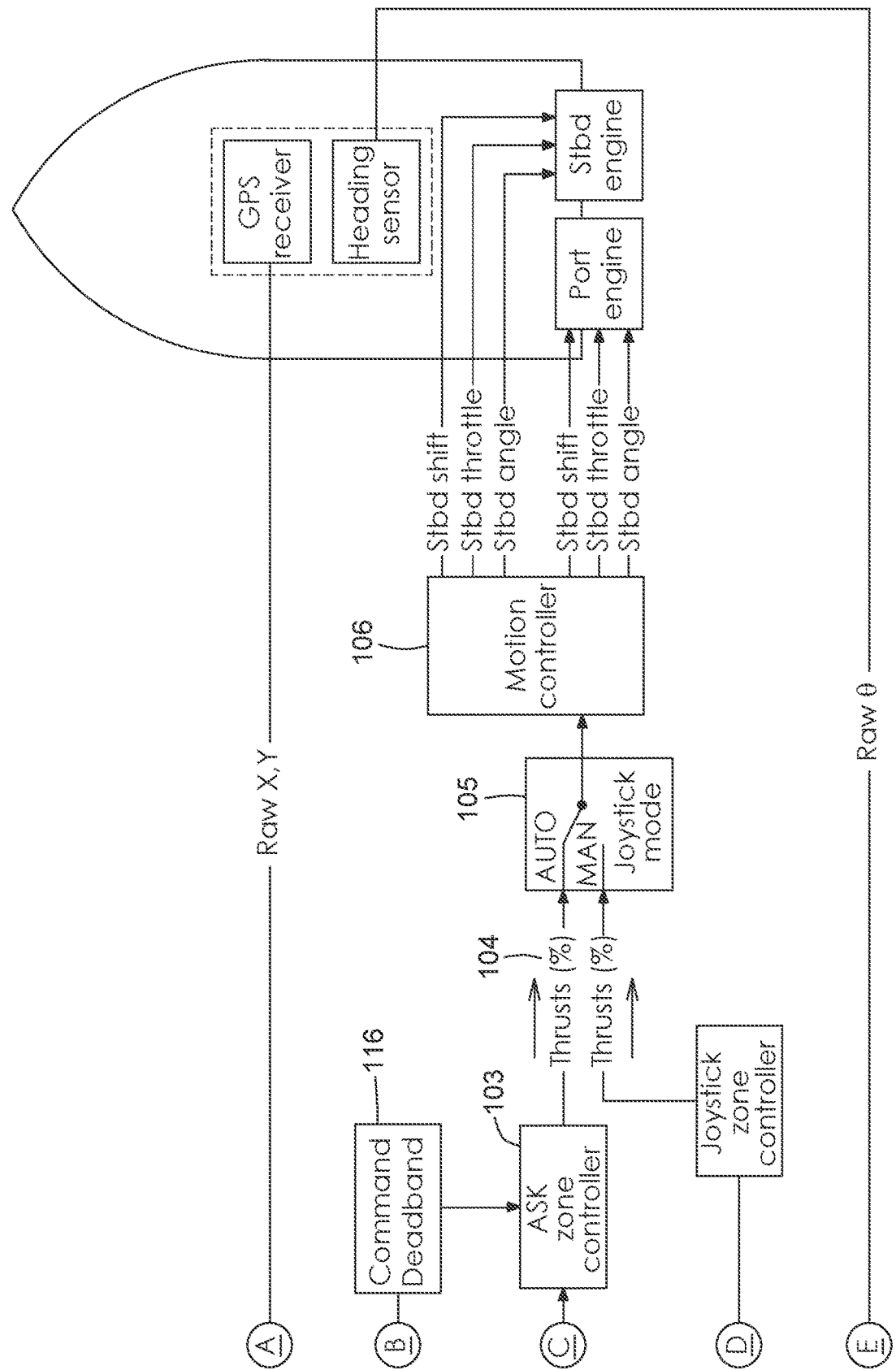
Figure 16:
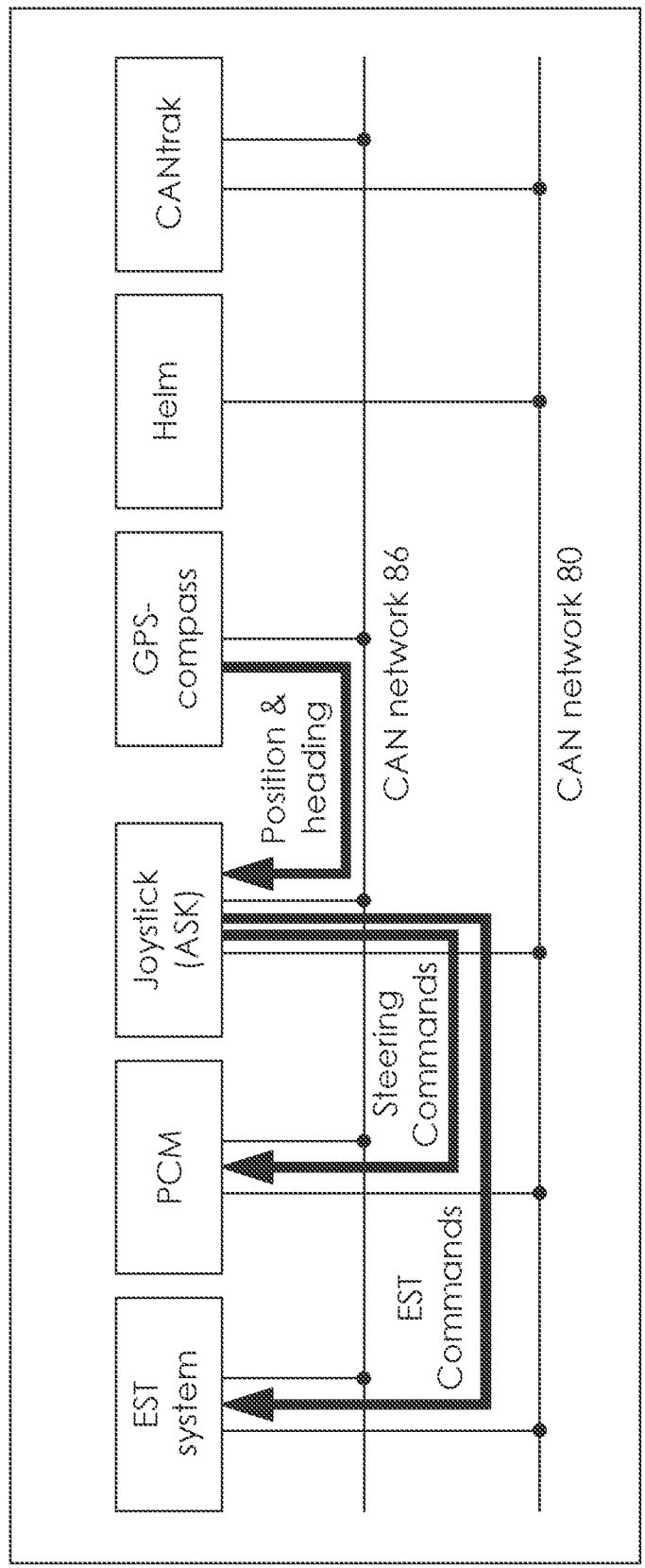
FIG. 16 is a schematic diagram showing CAN networks of the marine vessel control system.
Figure 17:
FIG. 17 is a schematic diagram showing thrust that may be generated to rotate a marine vessel, thereby minimizing a heading error difference.

Referring now to FIG. 15, there is shown a software logic of how the position control and heading control are implemented. In the fixed target position mode, when the operator requests a specific position command at t0, the position momentary switch 96 takes a snapshot of the target global position X, Y (t0) 97. The actual global position X, Y (t) 98 is subtracted from this target global position X, Y (t0) 97 to calculate the position error XE' and YE' 99. With the position hold switch 100 being ON, these errors are passed to the X and Y PID controllers 101. The X and Y thrust commands are then sent to the automatic station keeping zone controller 103. In the automatic station keeping mode, the thrust commands 104 are selected by the joystick mode switch 105. These thrust commands 104 are sent to the motion controller 106 to control the shift, throttle and steering commands to each engine.

Similarly, when the operator requests a specific heading command at t0, the heading momentary switch 107 takes a snapshot of the target heading $\theta$ (t0) 108. In the fixed target heading mode, the heading hold switch is switched to the ON position. The actual heading 110 is subtracted from this target heading $\theta$ (t0) 108 to calculate the heading $\theta$ error 111. This error is passed to the $\theta$ PID controller 112. The $\theta$ thrust command 113 is then sent to the heading hold switch 114. With the heading hold switch being ON, this $\theta$ thrust command 113 is sent to the automatic station keeping zone controller 103. In the automatic station keeping mode, the thrust commands 104 are selected by the joystick mode switch 105. These thrust commands 104 are sent to the motion controller 106 to control the shift, throttle and steering commands to each engine.

It is worth noting that, in the best heading mode, when the operator does not request a specific heading command, the heading hold switch is switched to the OFF position. The heading command 115 is still calculated as the vector angle of the X thrust command and the Y thrust command. This heading command is used for the close loop control instead.

In the case of a change in disturbance angle similar to the situation depicted in FIG. 10, the change of actual heading 111 over time is used to rotate the integral term of the X thrust command and the integral term of the Y thrust command. The amplitude of the integral vector can largely remain the same.

Traditional PID controllers may use an input deadband based on error to avoid constantly outputting a command. This negatively impacts the continuity of the P, I and D terms. With this system, the P, I, and D terms are calculated regardless of the size of the position error 99 and the heading error 111. The P, I, D terms are continuous and responsive. Instead, programmable output dead-bands 116, 117 are used to eliminate those thrust commands not large enough to impose a motion to the vessel.

As best shown in FIG. 1, the helm 20 and the joystick 24 are both plugged into a first CAN network 80 that allows the helm 20 and the joystick 24 to communicate with the pump control module (PCM) 26. The PCM 26 has a microcontroller (not shown) and may receive manually inputted operator commands from either the helm 20 or the joystick 24. The PCM 26 controls the output of hydraulic pumps 82 and 84 which respectively provide hydraulic fluid to the respective hydraulic actuators 28 and 30 of the engines 12 and 14 based on the user inputted commands. Accordingly, the helm 20 and the joystick 24 may be used independently or together to steer the marine vessel 10.

The control head 22 and the joystick 24 are both plugged into a second CAN network 86 that allows the control head 22 and the joystick 24 to communicate with a shift actuator 88 and a throttle actuator 90 of the port engine 12 as well as a shift actuator 92 and a throttle actuator 94 of the starboard engine 14. The shift and throttle actuators shift engine gears and increase or decrease engine throttle based on user inputted commands from either the control head 22 or the joystick 24 or both. Accordingly, the control head 22 and the joystick 24 may be used independently or together to control shift and throttle functions. It will be understood by a person skilled in the art that similar control schemes can be applied to marine vessels with more than two engines.

The GPS compass 32 and the ASK controller 34 are also plugged into the second CAN network 86 in this example. The GPS compass 32 provides position and heading information to the joystick 24 over the second CAN network 86. The joystick 24 in turn inputs steering and shift and throttle commands which are sent to the PCM 26 and the EST system over the CAN networks 80 and 86 as shown in FIG. 15. The joystick 24 allows the operator to conveniently adjust target position and heading direction commands. For example, the ASK controller 34 may be engaged in an initial target position. The operator can use the joystick 24 to move the marine vessel 10 to a new position. Upon the joystick 24 being released by the operator, the ASK controller 34 verifies whether the new position is stable. If the new position is verified as stable, then the new position becomes the new target position. A similar new heading command routine can also be performed with the joystick 24 to control the heading direction of the marine vessel 10. It will be understood by a person skilled in the art that input devices other than a joystick may be used to implement the automatic station keeping functions such as an engaged/disengaged button or a touch screen.

The automatic station keeping system disclosed herein has three main operating modes: position hold mode, heading hold mode, and position and heading hold mode. When the position hold mode is engaged, the system holds the position of the marine vessel while the heading of the marine vessel may change. When the heading hold mode is engage, the system holds the heading of the marine vessel while the position of the marine vessel is not controlled, allowing the marine vessel to drift freely with a current or a wind. When the position and heading hold mode is engaged, the system holds both the position and the heading of the marine vessel. If the marine vessel is not ideally aligned relative to a disturbance, such as a wind and/or a current, then position holding performance may be affected.

In the position hold mode with best heading enabled, the heading command ($\theta_{cmd}$ or ($180°-\theta_{cmd}$)), is the angle of the vector of the X-axis thrust command and the Y-axis thrust command. This heading command will be used instead of an operator specified command $\theta_{ro}$. The selected $\theta$ command is used for close loop control with the actual heading feedback by the $\theta$-axis PID controller. The output of the $\theta$-axis PID controller is the $\theta$ thrust command (%). The theta thrust command (%) rotates the marine vessel so that the actual heading is equal to the heading command.

The control algorithms of the ASK controller 34 control secondary axes when using the joystick 24. During operation of the joystick 24 along the X-axis, the ASK controller 34 corrects unwanted rotational motion and forward or reverse motions. During operation of the joystick 24 along the Y-axis, the ASK controller 34 corrects unwanted rotational motion and lateral motion. During operation of the joystick 24 about the $\theta$-axis, the ASK controller 34 corrects unwanted forward or reverse motion.

If the operator moves the joystick 24 while one of three operating modes is engaged, then the ASK controller 34 is temporarily disabled and the operator has full joystick control. When the joystick 24 returns to neutral, an acknowledgement prompt is displayed on a CANtrack display 31, shown in FIG. 1, and the operator has a period of time, for example, 30 seconds to re-engage the ASK controller 34 before the prompt disappears. Station transfers between joysticks will maintain the automatic station keeping operating modes. However, transferring from the joystick 24 to the control head 22 while the ASK controller 34 is active will disable the ASK controller 34. Returning back to the joystick 24 will not automatically re-enable the ASK controller 34.

FIGS. 18A and 18B show a list of faults that the joystick 24 can detect when the ASK controller 34 is enabled.

It will be understood by a person skilled in the art that many of the details provided above are by way of example only, and are not intended to limit the scope of the invention which is to be determined with reference to the following claims.

What is claimed is:

1. A method for maintaining a heading of a marine vessel using a rear mounted propulsion unit, the method comprising:
    setting a heading to a target heading of the marine vessel, the target heading being set independently from a course angle of the marine vessel;
    determining a current heading of the marine vessel;
    calculating a heading error difference between the target heading of the marine vessel and the current heading of the marine vessel, the heading error difference resulting from a disturbance being applied to the marine vessel;
    generating a thrust using the rear mounted propulsion unit to rotate the marine vessel to minimize the heading error difference; and
    allowing a position of the marine vessel to move along a course, while maintaining the heading of the marine vessel, by setting an angle of the target heading to be different from the course angle.

2. The method as claimed in claim 1 wherein setting the angle of the target heading to be different from the angle of the course includes setting the angle of the target heading independently from the angle of the course.

3. The method as claimed in claim 1 wherein generating the thrust using the rear mounted propulsion unit includes generating the thrust using a single rear mounted propulsion unit.

4. The method as claimed in claim 1 wherein allowing the position of the marine vessel to move along the course includes allowing the marine vessel to drift naturally as a result of the disturbance acting on the marine vessel.

5. The method as claimed in claim 1 wherein allowing the position of the marine vessel to move along the course includes allowing the marine vessel to move along the course through a waypoint.

6. The method as claimed in claim 1 wherein allowing the position of the marine vessel to move along the course includes allowing the marine vessel to move along the course through waypoints.

7. The method as claimed in claim 1 wherein allowing the position of the marine vessel to move along the course includes allowing the marine vessel to move along the course over ground.

8. The method as claimed in claim 1 wherein allowing the position of the marine vessel to move along the course includes allowing the marine vessel to drift naturally as a result of the disturbance acting on the marine vessel while allowing the marine vessel to move along the course through waypoints.

9. The method as claimed in claim 1 wherein allowing the position of the marine vessel to move along the course includes allowing the marine vessel to drift naturally as a result of the disturbance acting on the marine vessel while controlling a speed of the marine vessel.

10. The method as claimed in claim 1 wherein allowing the position of the marine vessel to move along the course includes controlling a speed of the marine vessel as the marine vessel moves along the course.

11. The method as claimed in claim 1 wherein setting the heading to the target heading includes setting incremental target headings.

12. A marine vessel having a marine control system, the marine control system comprising:
- a rear mounted propulsion unit and a steering actuator for steering the rear mounted propulsion unit;
- a shift actuator for shifting gears in the propulsion unit and a throttle actuator for increasing or decreasing throttle to the propulsion unit;
- an input device for providing user inputted steering commands to the steering actuator and for providing user inputted shift and throttle commands to the shift actuator and the throttle actuator;
- a heading control for setting a target heading of the marine vessel independently from a course angle of the marine vessel;
- a sensor for detecting a current heading direction of the marine vessel; and
- a controller which receives the target heading of the marine vessel from the heading control and the current heading of the marine vessel from the sensor, the controller calculating a heading error difference between the target heading of the marine vessel and the current heading of the marine vessel which results from a disturbance being applied to the marine vessel, and the controller signaling the rear mounted propulsion unit to generate a thrust to rotate the marine vessel to minimize the heading error difference, wherein a position of the marine vessel to move along a course, while maintaining the heading of the marine vessel, by setting an angle of the target heading to be different from the course angle.

13. The marine control system as claimed in claim 12, wherein the controller actuates the shift actuator and the throttle actuator in a presence of a heading error difference so that the rear mounted propulsion unit provides a counteracting thrust to minimize the heading error difference.

14. The marine control system as claimed in claim 13, wherein the controller a detects a direction of the disturbance causing the heading error difference, and the controller actuating the steering actuator to steer the rear mounted propulsion unit such that the counteracting thrust of the rear mounted propulsion unit is opposite in direction to the disturbance.

15. The marine control system as claimed in claim 13, wherein the counteracting thrust of the propulsion unit of the rear mounted propulsion unit is equal in magnitude to the force of the disturbance.

16. The marine control system as claimed in claim 12, wherein the controller actuates the shift actuator and the throttle actuator in a presence of a heading error difference so that the rear mounted propulsion unit provides counteracting thrusts to minimize the heading error difference.

17. The marine control system as claimed in claim 16, wherein the controller a detects a direction of the disturbance causing the heading error difference, and the controller actuating the steering actuator to steer the rear mounted propulsion unit such that the counteracting thrusts of the rear mounted propulsion unit are opposite in direction to the disturbance.

18. The marine control system as claimed in claim 16, wherein the counteracting thrusts of the propulsion unit are equal in magnitude to the force of the disturbance.

19. The marine control system as claimed in claim 12, wherein the controller automatically actuates the steering actuator in a presence of a heading error difference to steer the rear mounted propulsion unit to minimize the heading error difference.

20. The marine control system as claimed in claim 12 wherein the controller sets the angle of the target heading to be different from the angle of the course by setting the angle of the target heading independently from the angle of the course.

* * * * *